(12) United States Patent
Li et al.

(10) Patent No.: US 11,108,856 B2
(45) Date of Patent: Aug. 31, 2021

(54) METHODS AND APPARATUS FOR PERFORMING DISTRIBUTED COMPUTING USING BLOCKCHAIN

(71) Applicant: NAKAMOTO & TURING LABS INC, New York, NY (US)

(72) Inventors: Chong Li, Weehawken, NJ (US); Sichao Yang, Basking Ridge, NJ (US); Lei Zhang, West New York, NJ (US)

(73) Assignee: NAKAMOTO & TURING LABS INC, New York, NY (US)

( * ) Notice: Subject to any disclaimer, the term of this patent is extended or adjusted under 35 U.S.C. 154(b) by 376 days.

(21) Appl. No.: 16/274,178

(22) Filed: Feb. 12, 2019

(65) Prior Publication Data

US 2020/0076884 A1    Mar. 5, 2020

Related U.S. Application Data

(60) Provisional application No. 62/726,132, filed on Aug. 31, 2018.

(51) Int. Cl.
| | |
|---|---|
| *H04L 29/08* | (2006.01) |
| *H04L 9/06* | (2006.01) |
| *H04L 9/14* | (2006.01) |
| *H04L 9/30* | (2006.01) |

(52) U.S. Cl.
CPC .......... *H04L 67/108* (2013.01); *H04L 9/0637* (2013.01); *H04L 9/14* (2013.01); *H04L 9/3073* (2013.01); *H04L 2209/38* (2013.01)

(58) Field of Classification Search
CPC ..................................................... H04L 67/108
See application file for complete search history.

(56) References Cited

U.S. PATENT DOCUMENTS

| | | | | |
|---|---|---|---|---|
| 2018/0287780 A1* | 10/2018 | Safford | .................... | G06F 21/51 |
| 2019/0034892 A1* | 1/2019 | Smith | .................... | G06N 5/022 |
| 2019/0158606 A1* | 5/2019 | Guim Bernat | .......... | H04W 4/40 |
| 2019/0339688 A1* | 11/2019 | Cella | ................ | G05B 19/41865 |
| 2020/0366469 A1* | 11/2020 | John | .................... | H04L 9/3073 |

* cited by examiner

*Primary Examiner* — Simon P Kanaan
(74) *Attorney, Agent, or Firm* — Straub & Straub; Michael P. Straub; Stephen T. Straub

(57) ABSTRACT

Methods and apparatus for providing computing services using a blockchain and distributed computing are described. The methods and apparatus allow entities with processing nodes to allow others to contract for and use the computing capacity of the processing nodes without the need for a centralized controller to distribute processing tasks and provide access to the processing results.

20 Claims, 25 Drawing Sheets

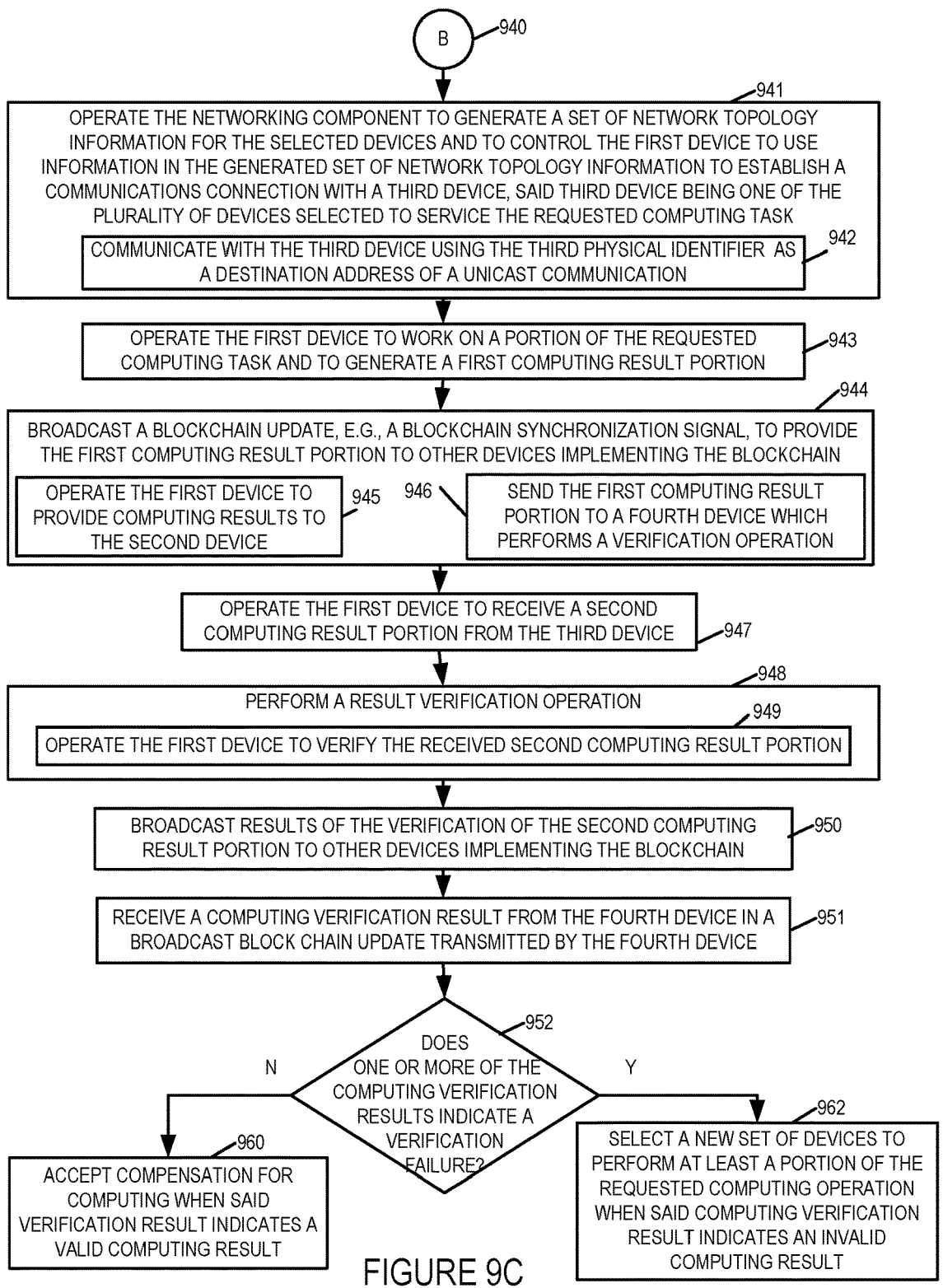

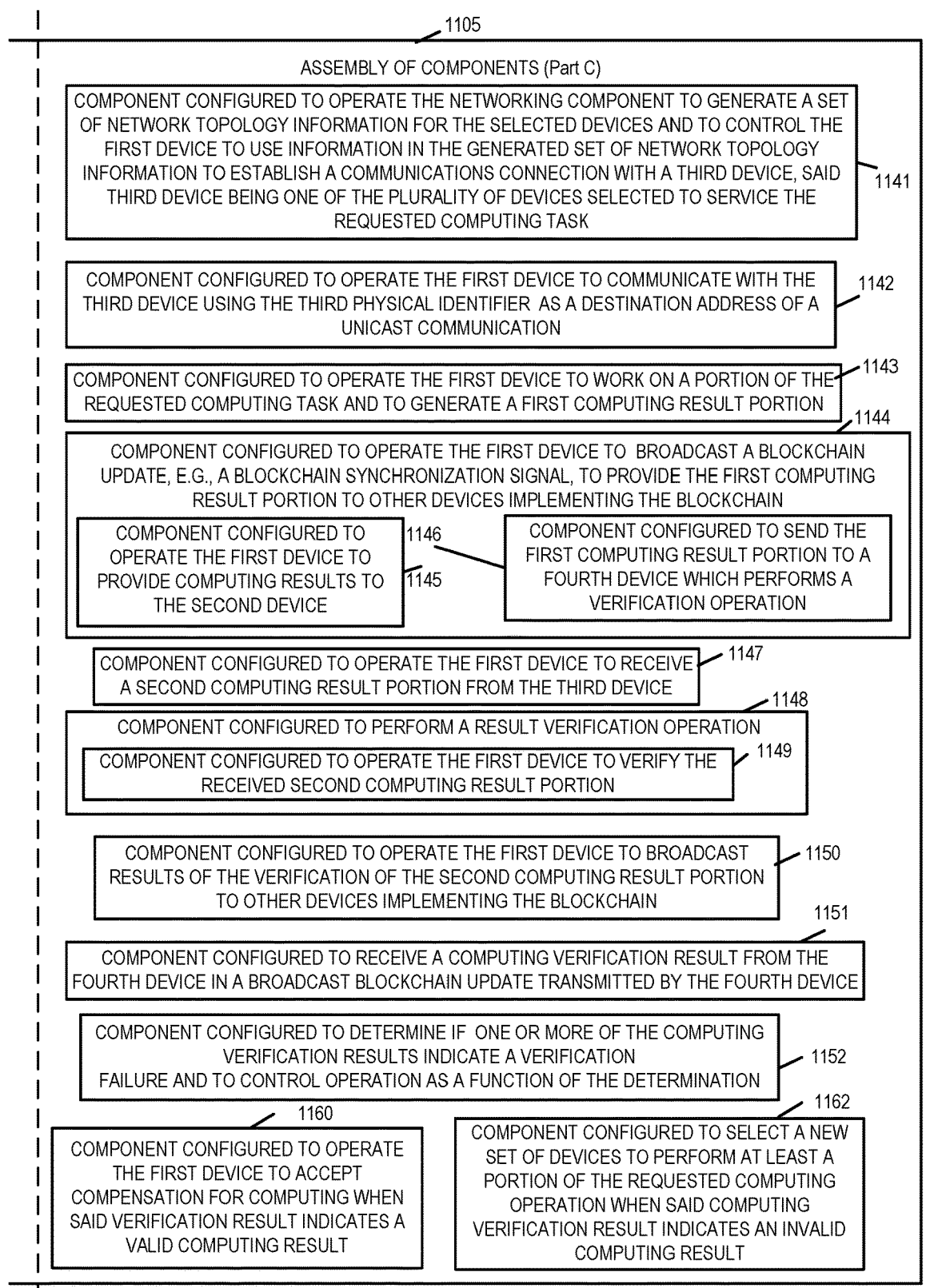

$$\begin{bmatrix} .9049 & .9797 & .4389 & .1111 \\ .2581 & .5949 & .6028 & .2217 \\ .4087 & .2622 & .7112 & .1124 \\ .2967 & .3188 & .4242 & .5079 \end{bmatrix} x = \begin{bmatrix} .9730 \\ .6490 \\ .8003 \\ .4538 \end{bmatrix}$$

$$x_i(t+1) = x_i(t) - P_i \left( x_i(t) - \frac{1}{d_i(t)} \sum_{j \in \mathcal{N}_i(t)} x_j(t) \right) \quad A_i x_i(1) = b_i$$

$$P_i = I - A_i'(A_i A_i')^{-1} A_i$$

$\frac{1}{d_i(t)}$ — The number of connected nodes to node $i$ at time step t $\sum_{j \in \mathcal{N}_i(t)}$ — connected nodes to node $i$ at time step t

METHODS AND APPARATUS FOR PERFORMING DISTRIBUTED COMPUTING USING BLOCKCHAIN

RELATED APPLICATIONS

The present application claims the benefit of U.S. Provisional Application Ser. No. 62/726,132 filed Aug. 31, 2018 which is hereby expressly incorporated by reference in its entirety.

FIELD

The present application relates to distributed computing tasks, networks and methods which can be used to provide computing services through the use of computing nodes, e.g., without the need for a centralized control device to assign and distribute computation tasks.

BACKGROUND

Blockchain, also known as distributed ledger, is a distributed, peer-to-peer topology where data can be stored globally on many nodes, e.g. thousands of nodes and thus realized as immutable. Bitcoin is one widely known cryptocurrency application using Nakamoto blockchain (a.k.a. blockchain 1.0). Ethereum, a.k.a. blockchain 2.0, introduced smart contract (an account with embedded coding programs) which uses blockchain stored applications for contract negotiation and facilitation. Using blockchain, these contracts are incredibly difficult for fraud or censorship.

Nowadays, heavy-computing jobs are emerging from a wide range of applications. For example, 1) machine learning: training a deep neural network with terabyte data and gigabyte models and 2) large scientific computing: solving a large system of linear equations (e.g. a system of 5000 linear equations). Such applications can be used in a wide range of fields from identifying patterns of use such as that of roadways, communications systems, etc. to facilitate better arrangement and connectivity between such systems. Highly computational tasks relating to modeling and designing devices in 3D from nuclear devices to homes and physical products are some of the tasks which may involve a high number of computations.

Currently users may utilize computing capacity from providers such as Amazon and IBM who provide cloud-based services. Such systems often use a centralized control system to allocate processing resources for tasks to particular users. This approach while being somewhat distributed in terms of the processing functionally still normally involves a centralized controller to control the distribution of computing tasks and the return of the results to the party to whom computing services are provided.

Applications for heavy computing can and are being used in a wide range of technology fields from pattern recognition used to identify traffic patterns to facilitate better roadway design and/or city layout.

The centralized nature of such a system has several disadvantages. One of which is reliability in that if the centralized controller fails users maybe unable to take advantage of what appear to be distributed processing resources. Another more practical drawback of such a system is the need to reach agreement with the centralized controller with respect to what computing services can be accessed and the cost that the operator of the centralized controller will charge for computing services.

While large cloud service providers often own a large number of computing devices to which they provide access through their centralized controller, small companies and individuals today often own one or more processing devices, e.g., desktop computers, laptops, notebooks and even cell phones with processing power that is often allowed to sit idle. Thus while many individuals and small companies own computing devices which are allowed to go unused for a large portion of the day. Such devices are often capable of performing all or a portion of a processing task. Unfortunately for the owners of such processing devices currently it may not be practical for them to rent out the unused processing capacity to entities seeking to have large computational tasks implemented due to a variety of technical problems which make leasing of unused computational capacity impractical for many owners of one or more processing devices.

From the perspective of a party which have computational capabilities which could be used by others, e.g., one or more idle PCs (personal computers). The technical problems include how to communicate to potential purchases of computational services processing capabilities and the availability of those processing capabilities in the absence of a centralized controller for interfacing with the potential users. How to reach agreement with potential customers of processing services with regard to the services to be performed and the compensation for such services particularly where multiple service providers maybe available for the potential customers to select from. Other technical problems include how to securely provide computation results to the customer who contracts for service and to receive compensation for the services.

From the perspective of a customer of computing services, the customer also faces several problems when there are a variety of different services providers offering computational services. The problems include how to become aware of the service providers and their computational capabilities, how to provide the computation task to one or more selected service providers potentially at different network and/or geographic locations, how to obtain computation results in a reliable manner, how to verify that the computational results are reliable and/or how to compensate the party providing the computational results for the received services.

The unused computational capacity of individual users, businesses and others offers a great opportunity for those seeking to have complex computational tasks addressed without the need for owning the actual devices performing the computations if one or more of the above discussed technical problems confronted by parties trying to provide computational services and/or parties trying to obtain computational services could be addressed. While not necessarily required for all embodiments or features, it would be desirable if at least some methods and/or apparatus could be developed which allowed for reliable distributed computing tasks to be assigned to one or more different entities with computing capability without the need to a central controller to coordinate the distribution of processing tasks and/or the communication of the processing results.

SUMMARY

Methods and apparatus for providing computing services using a blockchain and distributed computing are described. The methods and apparatus allow entities with processing nodes to allow others to contract for and use the computing capacity of the processing nodes without the need for a centralized controller to distribute processing tasks and provide access to the processing results.

Various consumers of computing resources would like to be able to take advantage of distributed computing resources to have one or more processing tasks completed. In various embodiments a distributed approach to performing computational tasks is described which take advantage of a blockchain, e.g., a public register in which transactions between users belonging are stored in a secure, verifiable and permanent way. In various embodiments a computing task is part of a transaction which is documented in the public register.

In some but not necessarily all embodiments devices who are available to provide their idle computing power to a network firstly provide their systems information to a smart contract which is part of a blockchain. The devices enter and leave the processing network, e.g., pass in and out, by providing updated smart contract information to the blockchain. From a time perspective, the process of nodes making themselves available or non-available is independent from a client service request and may occur asynchronously with respect to clients making service requests, e.g., through use of the blockchain.

In some embodiments, when a client device decides that it has a computational task to send out to devices willing and available to accept computational tasks, the client device sends out a task request, e.g., a machine learning (ML) task request for example, to a smart contract component of the blockchain. This task request includes in some embodiments task information on the task to be performed and/or processing requirements, e.g., the ML model size, dataset size, data format, etc., such that the smart contract component of the blockchain can use the task information to select providers from the network which are suitable for the task.

The smart contract component of the blockchain, in response to a task request, algorithmically selects a set of providers, e.g., available computing devices, for the requested task. In some embodiments the smart contract component also estimates a service rate based on the task information from the client and/or service charge information provided by selected providers.

In some, but not necessarily all embodiments, the smart contract feeds back the rate to the client device which submitted the task request to the blockchain and awaits a message from the client indicating acceptance of the service charge. If the client indicates acceptance of the communicate rate the task, the client sends a deposit and/or authorizes a deposit to be charged and confirmations to the smart contract that the rate has been accepted. The deposit maybe and sometimes is in the form of a crypto currency, such as one or more bitcoins, but the use of crypto currency is in no way critical or necessary to implementing the distributed processing techniques of the invention.

The smart contract component of the blockchain, in response to acceptance of the rate and thus the service offer, computes computing device configuration parameters and sends the relevant parameters to the devices which have been selected for implementing the computing task, e.g., a distributed computing task.

Once the devices, to which the computing task have been assigned by the blockchain, have completed a computing task, the results (e.g., weights of a neural network in a machine learning example) are provided back from the computing devices to the blockchain.

In some embodiments a validation component in the blockchain performs result validation. If the results are verified to be true, e.g., the result of the requested computation, the computing results are provided by the blockchain to the client device which requested that the computing task be implemented. In addition, in the case where the blockchain received a deposit or deposit authorization, the deposit and/or any other authorized service charge will be charged to the requesting client, e.g., the bitcoin deposit or a portion thereof will be released to the device or devices who provided the service and/or a portion of the service fee maybe provided to a device which participated in the results verification.

The methods and apparatus allow for a blockchain implemented on a distributed computing network, e.g., with multiple nodes updating and maintaining independent copies of the blockchain, to accept computing tasks, allocate the computing tasks to individual devices and provide the results back to the requesting device in a way that avoids the need for a centralized controller and allows for verification of the results in some but not necessarily all embodiments.

Accordingly, the methods and apparatus can be used by owners of one or more computing devices to offer computing services to others without the need of a centralized control system and the overhead and reliability concerns associated therewith.

An exemplary method of operating a first device with computing capability in a computing network, in accordance with some embodiments, comprises: receiving a blockchain based computing task request from a second device (requesting device); executing a resource allocation component (smart contract portion) of a blockchain to select multiple devices in the computing network to service the requested computing task, said resource allocation component outputting selected node information (e.g., node IDs, blockchain Account ID or other information identifying the selected compute nodes) to a networking component (networking smart contract), said first device being one of the selected devices; and operating the networking component to generate a set of network topology information for the selected devices and to control the first device to use information in the generated set of network topology information to establish a communications connection with a third device (another compute node), said third device being one of the plurality of devices selected to service the requested computing task; operating the first device to work on a portion of the requested computing task and to generate a first computing result portion; and operating the first device to provide computing results to the second device (requesting device).

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 7 comprises the combination of FIG. 7A and FIG. 7B.

FIG. 8, comprises the combination of FIG. 8A and FIG. 8B.

FIG. 9C is a third part of a flowchart of an exemplary method of operating a first device with computing capabilities in a computing network in accordance in an exemplary embodiment.

FIG. 9 comprises the combination of FIG. 9A, FIG. 9B and FIG. 9C.

FIG. 11C is a third part of a drawing of an exemplary assembly of components in accordance with an exemplary embodiment.

FIG. 11 comprises the combination of FIG. 11A, FIG. 11B and FIG. 11C.

FIG. 15 illustrates an update being performing over time by each of the computing machines in the distributed computing layer.

DETAILED DESCRIPTION

Figure 1:
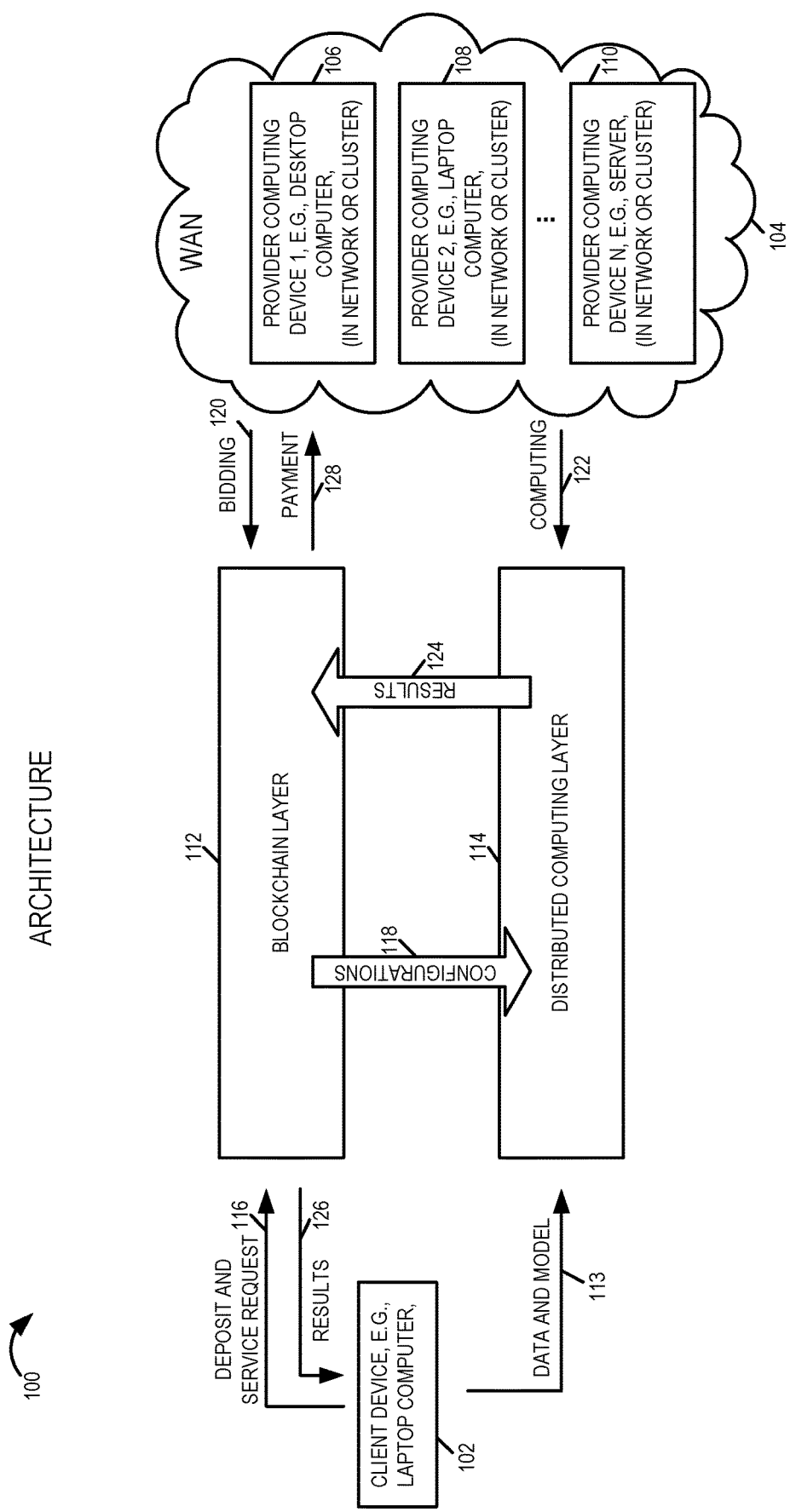
FIG. 1 is a drawing which illustrates exemplary architecture in accordance with some embodiments of the present invention.

Blockchain technology, also known as distributed ledger, is a distributed peer-to-peer topology where data can be stored globally on thousands of nodes and is often considered to be immutable. Bitcoin is one widely known cryptocurrency application using Nakamoto blockchain (a.k.a. blockchain 1.0). While cryptocurrency is one application for blockchain, various features of the present application relate using blockchain to facilitate distributed computing operations. The use of blockchain to facilitate solving the technical problem of supporting distributed computing operations in a reliable and, in at least some embodiments, verifiable manner, opens up the opportunity to take advantage of the computing capabilities of multiple computing devices, e.g., personal computers, cell phones, etc., which might otherwise sit idle for large periods of time.

Ethereum, a.k.a. blockchain 2.0, introduced smart contract (an account with embedded coding programs) which uses blockchain stored applications for contract negotiation and facilitation. Using blockchain, these contracts are resistant to fraud and/or censorship.

Blockchain technology is rapidly evolving with the objective to overcome the weakness of current blockchains, e.g., scalability. The directed acyclic graph (DAG)-based blockchain is promising and currently the mainstream of the ongoing research along this line.

The use of a blockchain-based distributed computing framework for a computing job, e.g., a heavy computing job requiring processing beyond that which can be provided by an individual process or personal computer, will now be described.

When a heavy computing job is required, cloud computing is often a popular choice as it benefits enterprises by reducing costs and enabling a focus on core business competence rather than IT and infrastructure issues. However, there are several key disadvantages of the cloud computing approach. With regard to security and privacy, using a cloud service means all data (even if it is very sensitive) has to be shared with the cloud service provider. This dependence on remote cloud-based infrastructure means taking on the risks of outsourcing everything. With regard to cost, nowadays, pay-as-you-go cloud service typically has an overall price tag that ends up being higher than expected.

On the other hand, the currently idle computing power from small computing devices such as desktops, laptops and servers is often wasted. While a single idle computer may not represent a huge amount of computing power idle PCs and other idle devices with computing power represent an enormous waste of available computing resources when they are considered together either in a geographic region or globally. In accordance with the present invention, one can aggregate many of idle computing devices and use them collectively through the use of blockchain, in a reliable manner as a super-computer or virtual cloud, to deal with heavy computing jobs or tasks. Thus, in some embodiments, implemented in accordance with the present invention, the idle computing power of a set of small computing devices is aggregated, e.g., as a super-computer, virtual cloud or networked set of processing devices, to perform a computing task, e.g., a requested heavy computing task, e.g., with different portions of the computing task being performed by different computing devices, e.g., with the devices performing the task communicating processing results between the devices performing the task and using a blockchain to store the processing results and, in at least some embodiments control not only which devices are to perform the processing but also the networking between the devices and providing of the results to a customer, e.g., customer device, requesting that a processing task be performed.

In various embodiments, in accordance with the present invention, a blockchain based computing framework with exemplary applications is implemented and used, in which the idle computing power of small computing devices can be, and sometimes are, aggregated to resolve big computing tasks in a distributed manner.

Nowadays, heavy-computing jobs are emerging from a wide range of applications. Various described methods and apparatus in accordance with the present invention are well suited for these emerging heavy computing jobs. One area of applications of heavy-computing jobs is the field of machine learning applications, e.g., training a deep neural network with terabyte data and a gigabyte model. Another area of applications of heavy-computing jobs is the field of large scientific computing, e.g., solving a large system of linear equation, e.g., a system of 5000 linear equations.

In the description which follows, a machine learning (ML) application is used as an example to describe various aspects and/or features of one or more exemplary embodiments of the present invention. The described framework, methods, and/or apparatus also apply to other applications which involve heavy computing.

FIG. 1 is a drawing 100 which illustrates exemplary architecture in accordance with some embodiments of the present invention. Drawing 100 illustrates an exemplary wide area network (WAN) 104 including a plurality of provider computing devices (provider computing device 1 106, e.g. a desktop computer, provider computing device 2 108, e.g., a laptop computer, . . . , provider computing device N, e.g., a server), and a client device 102, e.g., a laptop computer.

The provider computing devices (provider computing device 1 106, provider computing device 2 108, . . . provider computing device N 110) are, in some embodiments, part of a network or cluster which provides computing services, e.g., in response to a request for a computing task, e.g., with different selecting computing devices performing different portions of the requested computing task. In some embodiments, client device 102 is also part of the WAN 104.

The exemplary architecture includes a blockchain layer 112 and a distributed computing layer 114. Each of the computing devices (106, 108, . . . , 110) performs operations in the blockchain layer 112 and operations in the distributed computing layer 114.

Client device 102, which has a computing task to be performed, sends a deposit and service request 116, e.g., request for a computing task, to the blockchain layer. The service request is typically sent initially, and the deposit is typically sent after the client device accepts a contract, e.g., following bidding. Each of the provider computing devices (106, 108, . . . , 110) receives the service request. Biding information 120 is sent from the provider computing devices to the blockchain layer. The blockchain 112 selects a set of provider devices to perform the requested computing task, e.g., based on: the request requirements, the returned bidding information and the capabilities of the provider computing devices. Configurations 118 is sent from the blockchain layer 112 to the distributed computing layer 114. Data and model information 113, corresponding to the requested computing task, is sent from the client device 102 to the distributed computing layer 114.

The selected computing devices for the requested task perform computing portions, as indicated by arrow 122, and the results 124, which are generated in the distributed computing layer 114 are communicated to the blockchain layer 112. The results 124, subject to successful validation, are communicated to the client device 102, as results 126. Following successful results validation, payment 128 is sent to the provider computing devices, which performed the computing task.

Figure 2:
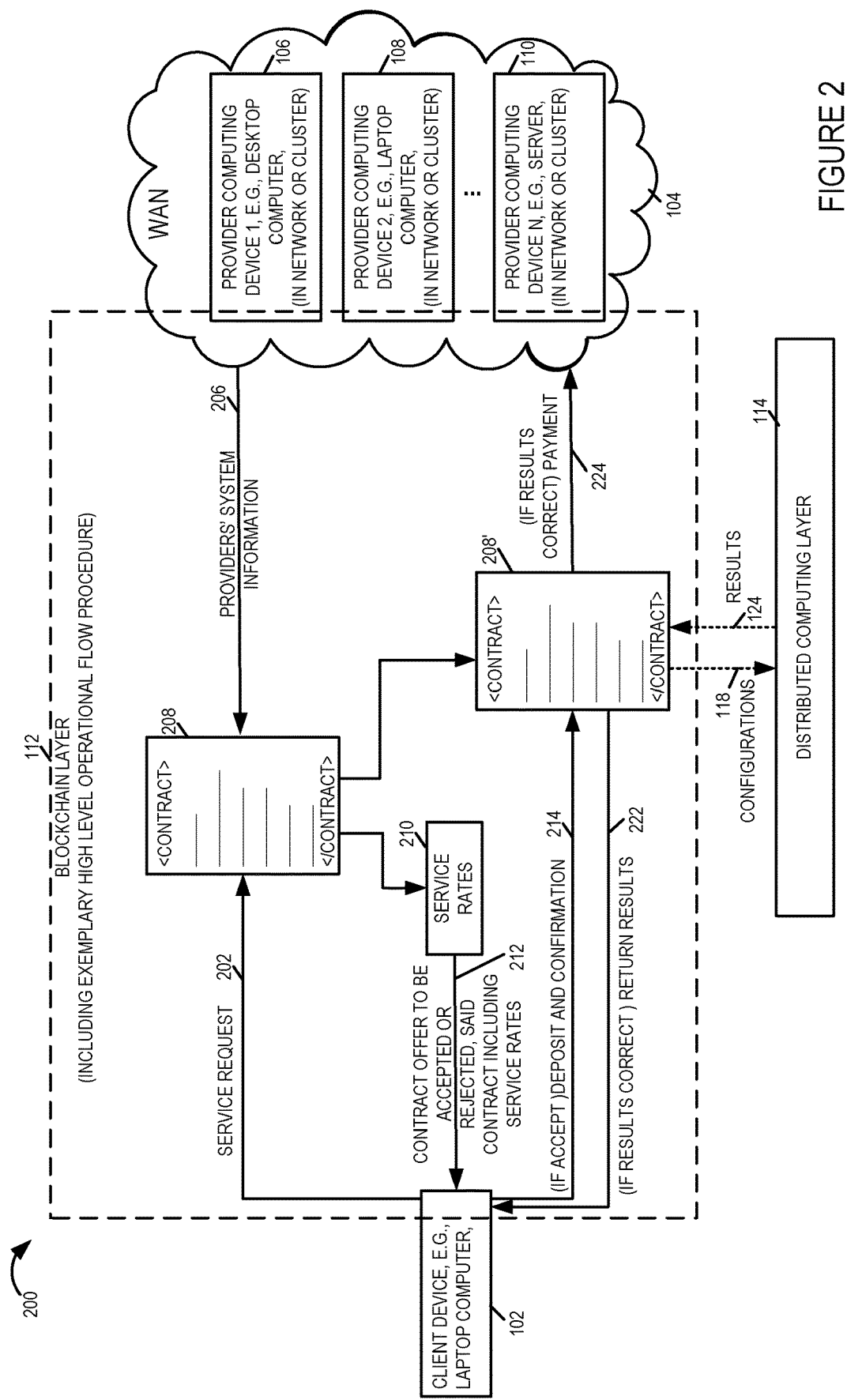
FIG. 2 is a drawing used to illustrate blockchain layer procedural flow in accordance with an exemplary embodiment.

FIG. 2 is a drawing 200 used to illustrate blockchain layer procedural flow in accordance with an exemplary embodiment. Drawing 200 illustrates the exemplary wide area network (WAN) 104 including a plurality of provider computing devices (provider computing device 1 106, e.g. a desktop computer, provider computing device 2 108, e.g., a laptop computer, . . . , provider computing device N, e.g., a server), the client device 102, e.g., a laptop computer, the blockchain layer 112 and the distributed computing layer 114.

Providing computer devices (106, 108, . . . , 110) each send their provider information to the smart contract 208 of the blockchain layer 112, as indicated by arrow 206. The provider system information may be, and sometimes is, updated over time, e.g., based on current provider device conditions and/or available computing capabilities. Client device 102 generates and sends a service request 202 to the smart contract 208 of blockchain layer 112. Based on the service request 202 and the providers' system information 206, the smart contract 206 determines a service rate 210 for performing the requested computing task. The smart contract 208 generates a contract offer 212 which is communicated to the client device 102; the offer, which includes service rates, may be accepted or rejected by the client device 102. If the client device 102 decides to accept the offer a deposit and confirmation is sent by the client device 102 to the blockchain. Based on the accepted offer the contract 208 performs operations to initiate computations and obtain results. Contract 208' represented contract 208 at a later point in time. Configurations 118 are sent from the smart contract 208' of the blockchain layer 112 to the distributed computing layer 114. The selected computing devices which have been selected to perform the computing task, in accordance with accepted offer, perform their computing operations, in the distributed computing layer 114, e.g., obtaining computing result portions, and send computing results 124 to the blockchain layer 112. The results 124 are subjected to verification by the smart contract 208' in blockchain layer 112, e.g., by one or more computing devices operating as judges. If the results satisfy verification, e.g., the results are determined to be correct, then the results are retuned to the client device 102, as return results 222, and payment 224, e.g., from the previously received deposit, is sent to the computer devices which performed the computing operations.

Various aspects and/or features of the blockchain layer, e.g., blockchain layer 112, will be described below. The underlying blockchain technique can be any blockchain that supports smart contract functionality. Exemplary blockchains which may be used in accordance with the present invention include, e.g., Nakamoto-POW-based blockchain (e.g., Ethereum), and directed acyclic graph (DAG)-based blockchain (e.g., Byteball, hashgraph).

One example of smart contract, e.g., contract 208, is as follows: an asset or currency is transferred into a program, and the program runs this code and at some point it automatically validates a condition and it automatically determines whether the asset should go to one person or back to the other person, or whether it should be immediate refunded to the person who sent it or some combination thereof. In the meantime, the decentralized ledger (i.e. blockchain) also stores and replicates the document which gives it a certain security immutability.

The configuration, e.g., configuration 118, as an output of the smart contract, in some embodiments, is referred to as all necessary parameter/signaling which are required by the distributed computing layer, e.g., distributed computing layer 113, to configure and conduct the assigned job.

Exemplary blockchain procedure will now be described. Devices, e.g., devices 106, 108, . . . , 110, who are willing to provide their idle computing power to the network firstly provide their systems information, e.g., providers' system information 206, to the smart contract, e.g., contract 208. The devices can, and sometimes do, pass in and out with such information. From the timeline perspective, in some embodiments, the process is independent form the client service request, e.g. client service request 202. When the client, e.g., client device 102, arrives the client device sends out a computing task request, e.g., a ML task request, to the smart contract, e.g., contract 209. The request, e.g., service request 202, includes at least information on the model size, e.g., ML mode size, dataset size, and data format such that the smart contract can use them to select providers from the network. The smart contract, e.g., smart contract 208, then algorithmically selects a set of providers for such a job and estimates a service rate, e.g., estimated service rate 210, based on the information from the client, e.g., information in service request 202, and selected providers, e.g., information in providers' system information 206. The smart contract, e.g., smart contract 208, feeds the rate to the client, e.g., via contract offer 212.

If the rate is accepted the client sends its deposit, e.g., cryptocurrency, and confirmation, e.g., via signal 214 to the smart contract, e.g., approved smart contract 208'. Then the smart contract, e.g., approved smart contract 208', will compute all the configuration parameters via a set of algorithms and send these parameters, e.g., as configuration 118, to the distributed computing layer, e.g. distributed computing layer 114, for the computing job, e.g., the ML job.

Once the computing job, e.g., ML job, is completed, results, i.e. weights of a neural network, are fed back, e.g., as results 124, to the blockchain layer, e.g., blockchain layer 112, which will perform validation. If the results are verified to be true, the deposit token from the client will be released to the selected providers, which perfumed the computing task, e.g., as payment 224, and the computing results, e.g., ML results, will be returned to the client, e.g., as return results 224 to client 102.

Figure 3:
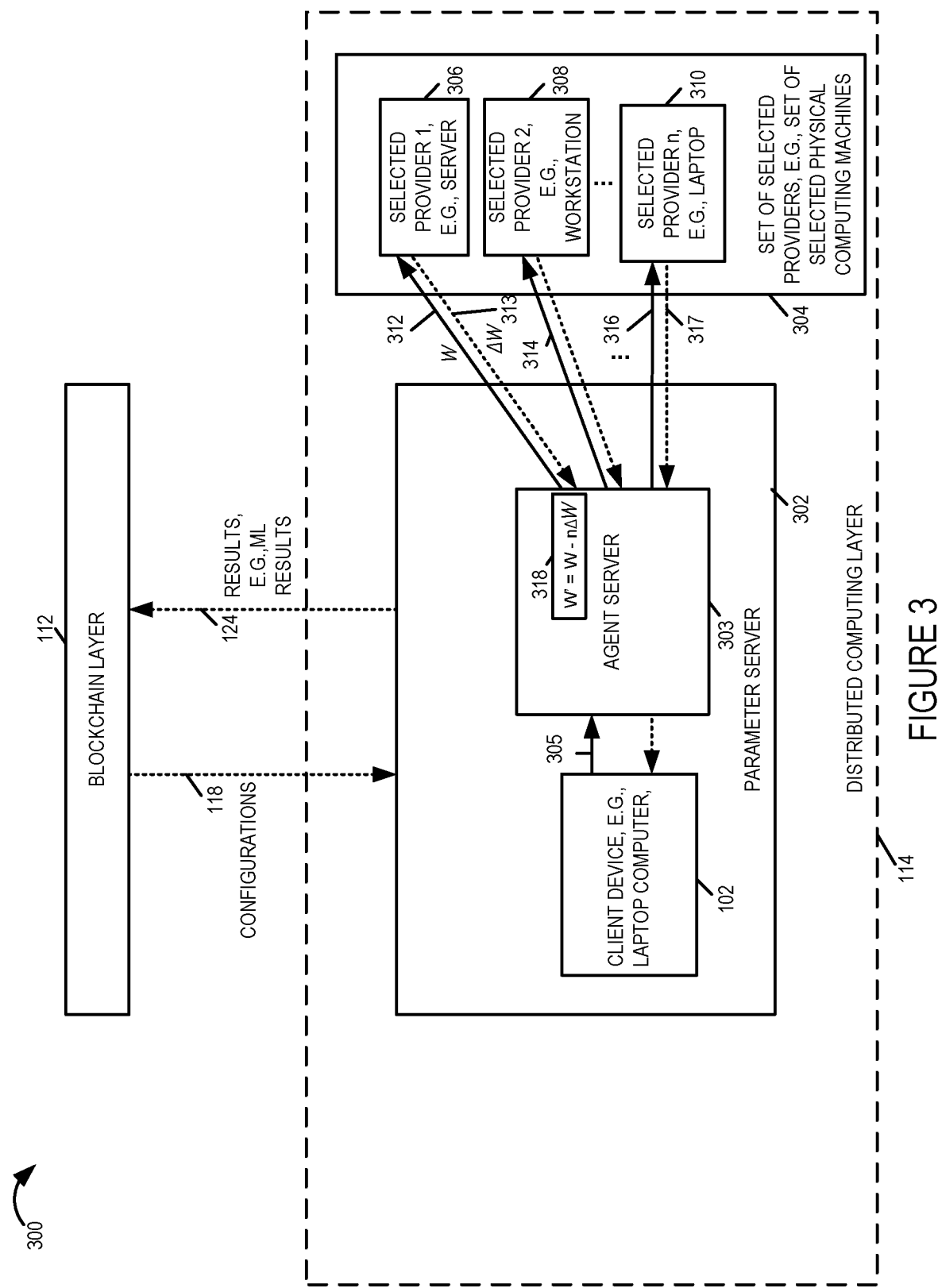
FIG. 3 is a drawing used to illustrate and exemplary distributed computing layer in accordance with an exemplary embodiment.

FIG. 3 is a drawing 300 used to illustrate and exemplary distributed computing layer 114 in accordance with an exemplary embodiment. Drawing 300 illustrates an exemplary set of selected providers 304, e.g., a set of selected physical computing machines including a plurality of provider computing devices (selected provider 1 306, e.g. a server, selected provider 2 308, e.g., a workstation, . . . , selected provider n 310, e.g., a laptop). The n selected service providers (306, 308, . . . , 310) of set of selected service providers 304 are devices from the set of N provider computing devices (106, 108, . . . 110), where n is less than or equal to N, and n is greater than or equal to one. Drawing 300 further illustrates the blockchain layer 112 and the distributed computing layer 114. The distributed computing layer 302 includes a parameter server 302 including client device 102, e.g., a laptop computer, and an agent server 303. Configurations 118 are sent from the blockchain layer 112 to the parameter server 302 of the distributed computing layer 114, and results 124, e.g., ML results, are sent from the parameter server 302 of the distributed computing layer 114 to the blockchain layer 112.

Various aspects and/or features of the parameter server 302 will now be described. The client device 102 and agent server 303 can be, and in some embodiments are, located in the same entity. For example, in some embodiments, client device 102 includes agent server 303. In some such embodiments, the client performs each of the on-line computations, e.g., coordination, parameter update, failure resilience, etc.

In some embodiments, the agent server 303 is a server or a gateway node that represents the client device 102, and only feeds back the final results to the client device 102. In some such embodiments, the client device 102 has minimal engagement in computing.

Various aspects and/or features of providers (306, 308, . . . , 310) will now be described. Providers can be any physical computing machine, such as a server, a workstation, a laptop, a tablet, etc.

An exemplary distributed computing layer procedure will now be described. The client 102 sends its ML model and all dataset to the agent server 303, e.g. via signals 305. The dataset in the agent server 303 is partitioned over and then sent to each of the selected providers (306, 308, . . . , 310) according to their individual capabilities. One example includes employing a HADOOP job (in a HADOOP cluster) to split training data randomly across each of the providers (306, 308, . . . , 310). In general, distributed machine learning can be realized via data parallelism or model parallelism or a combination or both. In this example, corresponding to drawing 300 of FIG. 3, data parallelism is used.

During the training process, the agent server 303 performs a stochastic gradient decent process with the help of each of the providers (306, 308, . . . , 310). For instance, parameter w is the weight of neural networks. The parameter w is communicated to each of the providers (306, 308, . . . , 310), as indicated by arrows (312, 314, . . . , 316). Each provider (306, 308, . . . , 310) calculates a $\Delta w$ or a batch of samples from its local dataset, then passes it to the agent server 303, as indicated by arrows (313, 315, . . . , 317). Once received a $\Delta w$ from provider i, the agent server 303 updates the training parameter w according to the gradient descent updating formula and feeds back this w to the provider i. This process can be, and sometimes is, asynchronous among providers 306, 308, . . . , 310) due to their different network latencies and computing capabilities. When the training is complete, the agent server 303 reports the computing results 124, e.g., ML results, to the blockchain layer 112.

In some embodiments, deep learning libraries, e.g., tensorflow, caffe, etc., are deployed in prior into the provider devices (306, 308, . . . , 310) with certain executors. For example, for cluster-based distributed ML, Spark executer along with Hadoop can be, and sometimes are, employed. Various embodiments of an exemplary system, implemented in accordance with some embodiments of the present invention, support message passing interface (MPI) communication between the providers (306, 308, . . . , 310) and the agent server 303. Such communications links are, e.g., InfiniBand, Ethernet and worldwide internet.

Features and/or aspects of exemplary smart contract will now be described. In some embodiments, an exemplary smart contract can, and sometimes does, call four sub-smart contracts as subroutines. In some embodiments, the smart contract is viewed as including the four sub-smart contracts. In some embodiments, the four sub-smart contracts are referred to as four smart contracts, e.g., a resource allocation contract, a networking contract, a security contract, and a validation contract.

In some embodiments, the smart contract or contracts are executed by each of the nodes (or miners) in the network. Thus, motivated, the number of computational steps performed in Ethereum's smart contract is limited by a variable gaslimit. By doing so, very little computation (less than a fraction of second) can be conducted in the smart contract. If no gaslimit, the network can be easily flushed by a malicious node.

In accordance with a feature of some embodiments of the present invention, if needed, each sub-smart contract (e.g. a Ethereum's smart contract) can outsource the computation to one or a few nodes (e.g., the most powerful miners in bitcoin network) to bypass this computational restriction.

The configuration parameters linking the blockchain and distributed computing layers are the outcome of these smart contracts.

An exemplary sub-smart contract: Resource Allocation will now be described. The resource allocation contract: processes the computing task request and provider's information, selects a set of providers to perform a computing task, and estimates a service rate for the client. In some embodiments, the provider's information includes computing capability (GPU, CPU, etc.), connectivity capability (turn-on duration, bandwidth), and storage capability (memory size, buffer size, etc.) In some embodiments, an optimization method is used to select the set of providers.

An exemplary sub-smart contract: Networking will now be described. The networking contract establishes the network for the distributed computing job. The output of this contract determines the network topology of selected nodes. These selected nodes or providers establish the network in a peer-to-peer manner. That is, each node broadcasts a connection signal. Other nodes will use this received connection signal to establish a link between the nodes according to the topology. The connection signal includes the information for a provider to connect to another provider. Such information may include, e.g., domain name, IP address, alias, etc.

Figure 4:
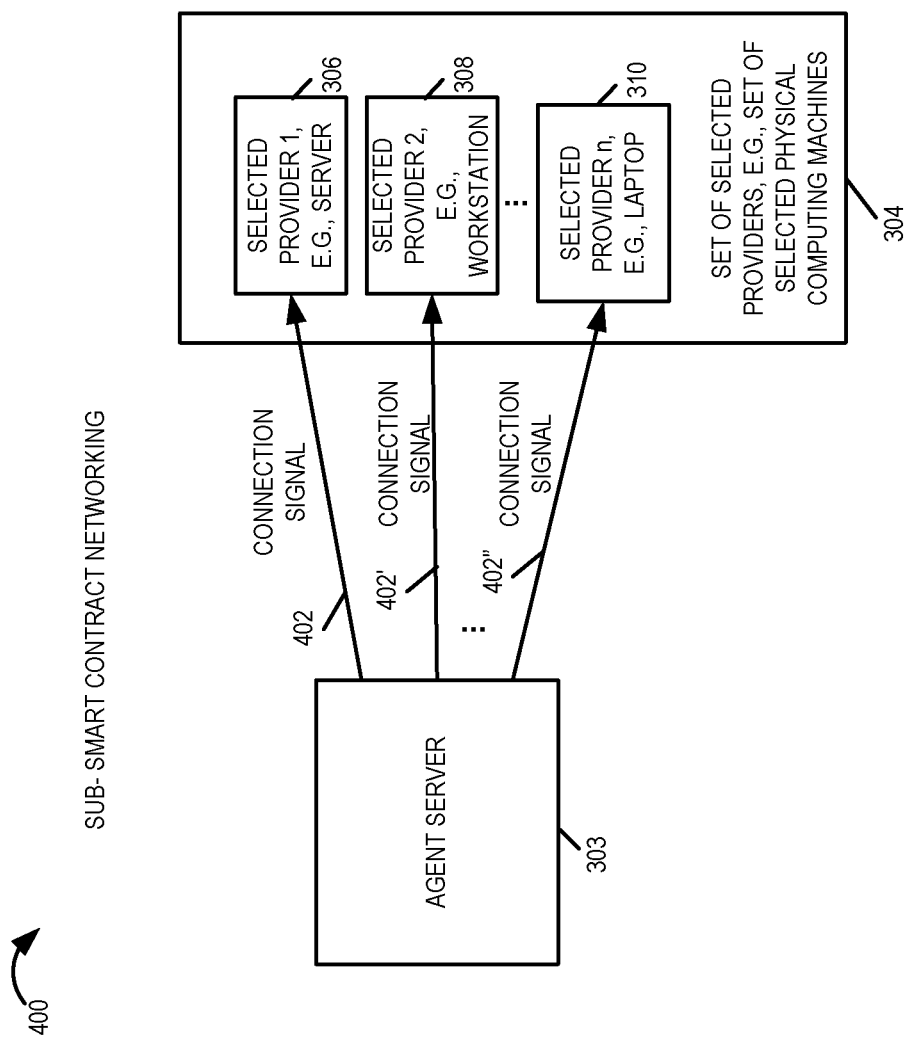
FIG. 4 illustrates a tree network topology being used in an exemplary computing example, e.g., a ML application example.

For example, drawing 400 of FIG. 4 illustrates a tree network topology being used in an exemplary computing example, e.g., a ML application example. In this case the agent server 303 sends out the connection signal (402, 402', . . . , 402") to selected provider devices (306, 308, . . . , 310). For other applications, e.g., application solving large linear equations, the network topology can be, and sometimes is, ad hoc.

An exemplary sub-smart contract: Security will now be described. The security contract is used to be able to securely pass messages among the distributed computing devices.

For example, to securely communicate ML parameters between providers (306, 308, . . . 310) and client (102) or agent (303), in some embodiments, asymmetric (public) cryptography is used. In one embodiment, it is assumed that the size of parameters is small, and the following RSA-based algorithm is performed. The agent server generates a pair of public key and private key (K1, D1). The agent server distributes its public key (K1) to each of the providers. Similarly provider generates a pair of public key and private key (K-i, D-i). Each of the providers sends their public keys (K-i) to the agent server. In the process of parameter exchange (e.g., w and Δw), providers use public K1 to encrypt the parameters and then transmit the encrypted message. The agent server uses its private key D1 to decode the message. In the other direction, the agent server uses public key K-i to encrypt the updated parameters w to the ith provider. Then the ith provider uses its own private key D-i to decode the message.

In some embodiments, to securely transfer a large size of (training) data, symmetric cryptography is used. A secret key is shared using the asymmetric cryptography method. Then the secret key is used for the symmetric cryptography.

An exemplary sub-smart contract: Validation will now be described. The validation contract validates the results obtained from the distributed computing platform. Once the agent server 303 reports the solution to the blockchain layer 112, verifiers, e.g., nodes which perform verifications operations to confirm results, will call the validation smart contract to check the solver's solution. The solution can be, and sometimes is, an intermediate solution in the process of parameter exchange between the agent server 303 and each provider (306, 308, . . . , 310). A verifier can be one or more nodes in the network. In some embodiments a node used for verification can be, and sometimes is a node which volunteered to perform verification operations. In some embodiments, a node used for verification has been pre-assigned to perform verification operations. Various protocols and/or methods to validate the computing results may be used. One example of a verification method, which may be, and sometime is, used in an exemplary embodiment, is TrueBit. In particular, in TrueBit, the challengers and solvers play a validation game off-chain say, in a TrueBit Virtual Machine. This is because the computation capability in a smart contract is limited by gaslimit and thus small. Then, the discrepancy (e.g., a few lines of codes) will be reported to the judges (nodes who run the TrueBit smart contract). The judges will decide who wins the game in the smart contract. If the solver loses the game, the deposit from the solver will be deducted and meanwhile the challenger will receive incentives for doing so. To encourage nodes to be challengers, TrueBit enforces a set of solvers to regularly send fake results. By doing so, challengers can always have a chance to get a reward. Therefore, there is a very high probability, e.g., it is almost guaranteed, that there always exist some challengers in the network.

Various aspects and/or features related to robustness of design of various embodiments of the present invention will now be discussed. Various embodiments include provider failure resistance. A provider can drop off due to many reasons including: network disconnection, accidental power-off, etc. An important idea, in accordance with one feature of some embodiments of the present invention, is that the process of computation of a snapshot of the status of system shall be taken regularly and stored in one or more devices. Once the failure occurs, the system may start from the latest status recorded from the snapshot. An exemplary resilience method, which may be, and sometimes is, used in the exemplary distributed computing application, e.g., ML application, is described below. In every t_i time slot, the i-th provider feeds back the status information along with the training parameters to the agent server. Such status information may include the percentage of data that has been used for training. The agent server regularly stores the status information for each provider. If the i-th provider failure occurs, the agent server selects another provider j and sends it the latest training parameters with unused dataset from the i-th provider.

An exemplary method of blockchain-based distributed computing over a plurality of devices in a network, in accordance with some embodiments, comprises: receiving systems information from a plurality of computing devices; receiving a request for a computing task; estimating a service rate for the received request; generating configuration parameters for the distributed computing implementation; and conducting payment among the engaged computing devices. An exemplary blockchain-based distributed computing system, in accordance with some embodiments, comprises: a protocol that allocates needed computing resource to a plurality of computing devices; a protocol that provides each of the networking configurations to establish a topological network; a protocol that employs security on the exchanges of messages among distributed computing devices; and a protocol that verifies results obtained from a distributed computing layer.

Exemplary methods and apparatus in accordance with the present invention are well suited for solving larger linear equations. A simple example will now be described to illustrate an exemplary method in accordance with the present invention.

Figure 13:
FIG. 13 illustrates linear equations in a matrix representation corresponding to an exemplary computing task from one client device.

Drawing 1300 of FIG. 13 illustrates linear equations in a matrix representation. Drawing 1300 is an exemplary computing task from one client device. The linear equations may be solved via an exemplary blockchain-based distributed method and apparatus implemented in accordance with an embodiment of the present invention.

Figure 14:
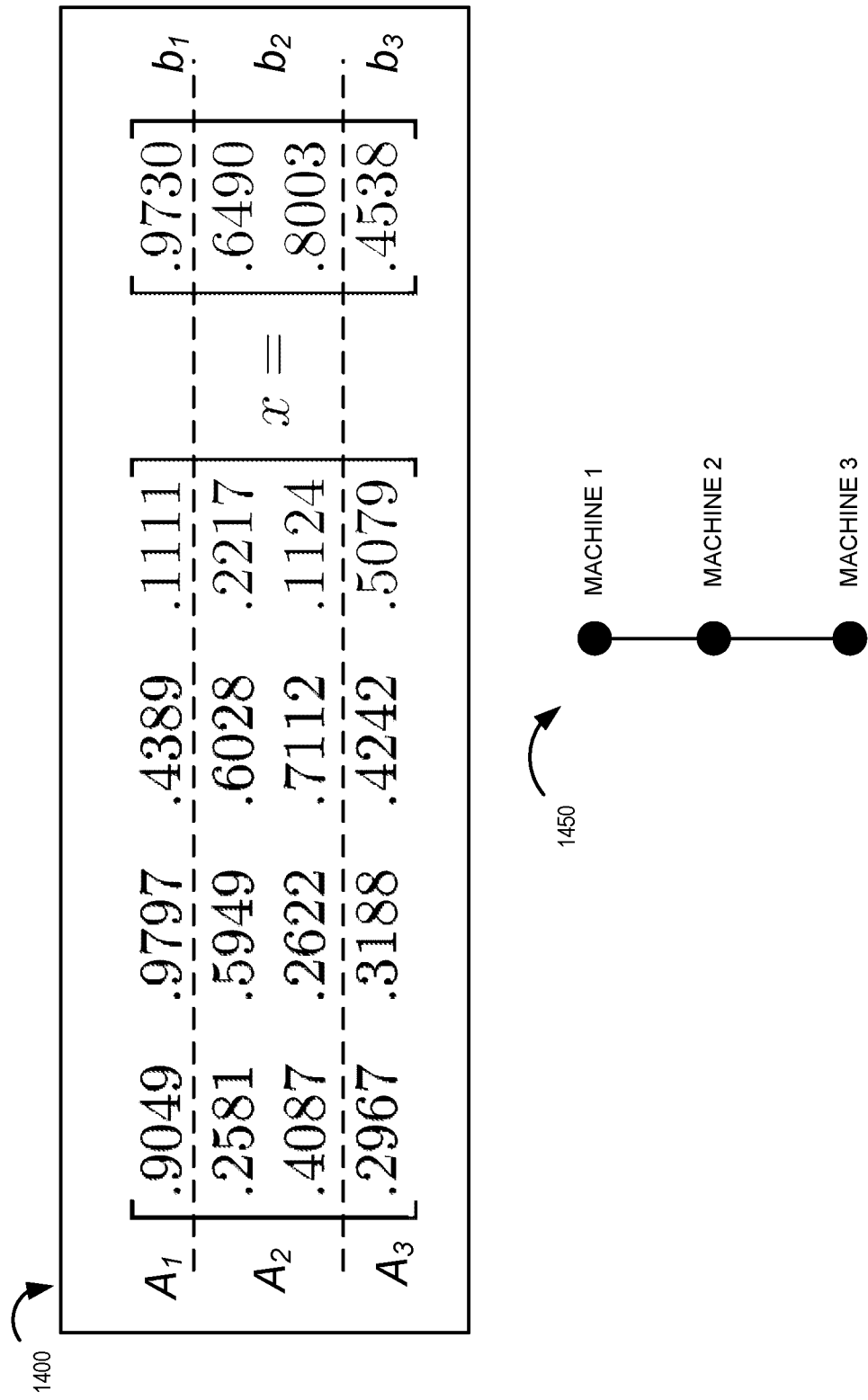
FIG. 14 illustrates exemplary partitioning of a computing task of FIG. 13 between three computing devices which are topologically connected in a line network.

Assume that there exist three or more providers, e.g., computing devices which provide computing services, in the network. The resource allocation contract component selects three computing machines for the task. According to the machines' capabilities, the equations can be partitioned as follows with each partition (A_i, b_i) stored in one machine. See drawing 1400 of FIG. 14 which illustrates the partitioning.

The networking contract component determines that these three machines are topologically connected as a line network. See drawing 1450 of FIG. 14.

The security contract component generates keys for secure message transfer in the network.

In the distributed computing layer, each of the machines is performing the update indicated in drawing 1500 of FIG. 15 over time.

The message passing over WAN is the updated x_i(t). Here x_i(t) is the estimated solution in machine i at time step t. This information x_i(t) shall be encrypted as instructed by the security smart contract component, i.e. using asymmetric cryptograph.

Figure 16:
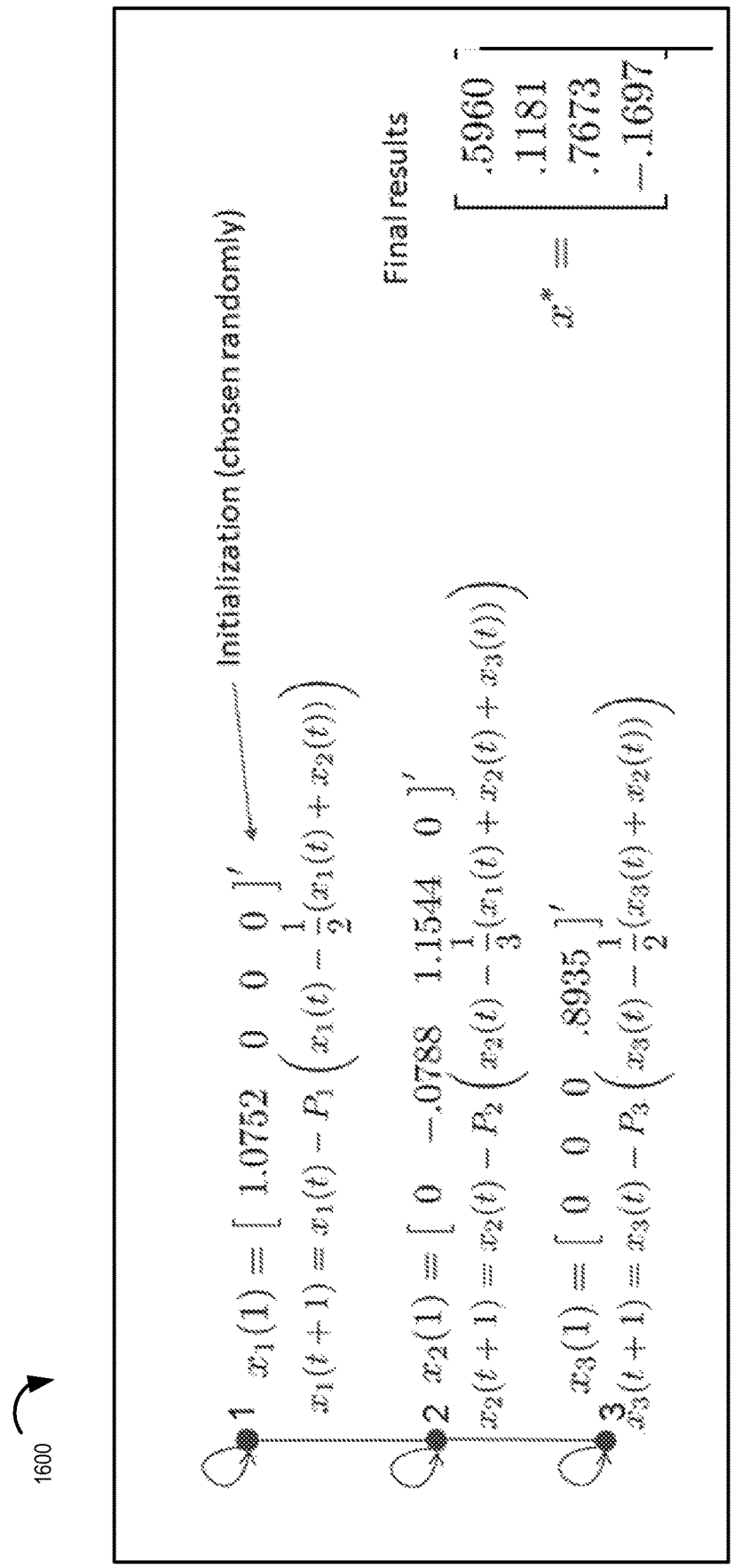
FIG. 16 illustrates machine updating in the distributed computing layer and the final results, which are passed to the blockchain layer.

Drawing 1600 of FIG. 16 illustrates machine updating in the distributed computing layer and final results, which are passed to the blockchain layer. Specifically, machines are updating as show in drawing 1600 of FIG. 16. The distributed computing layer passes the final results to the blockchain layer. Then the validation contract will be executed to verify the results. If the results are determined to be true, payment will be given to the three machines and the result will be fed back to the client device.

Figure 5:
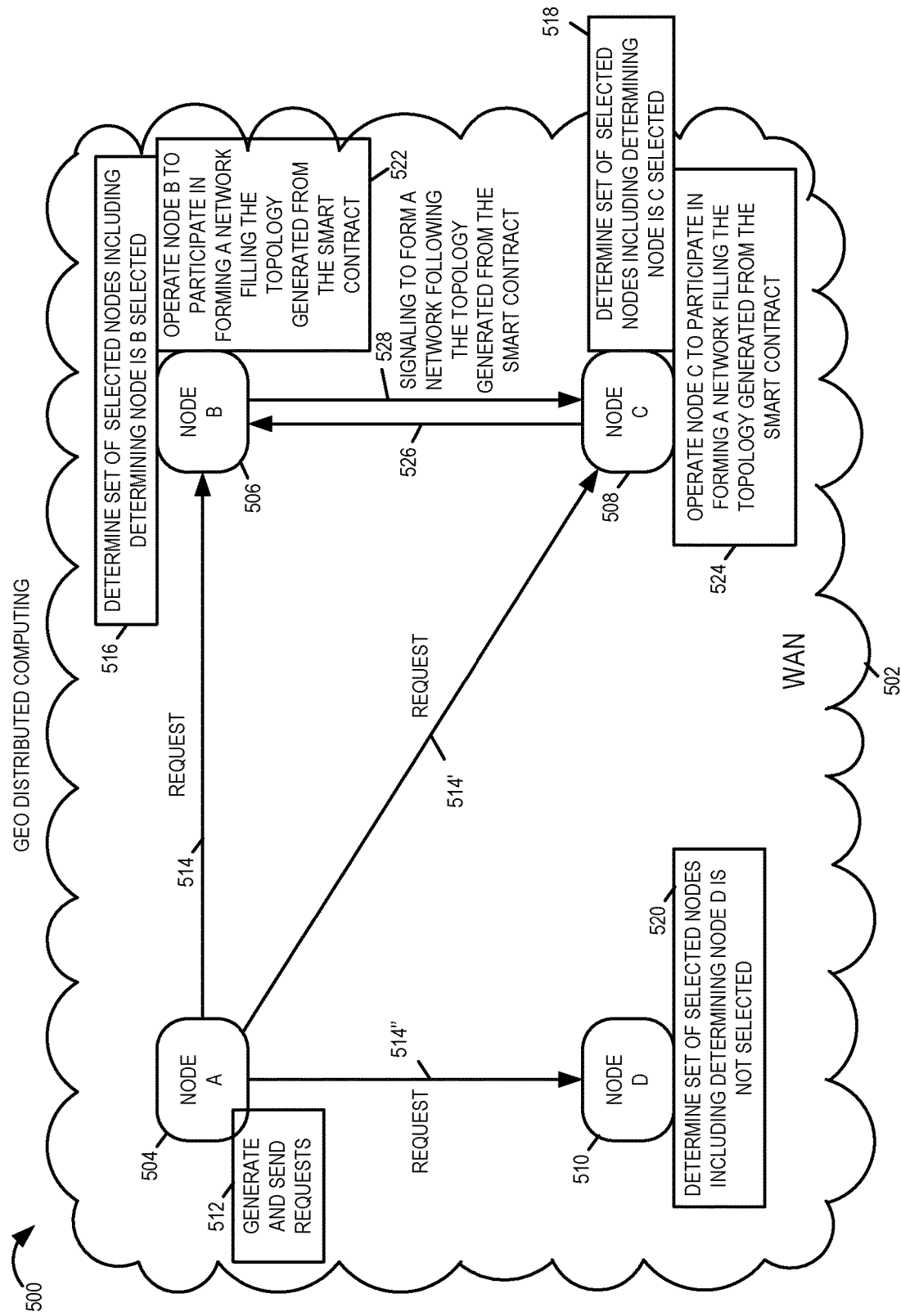
FIG. 5 is a drawing illustrating exemplary geo distributed computing in accordance with an exemplary embodiment.

FIG. 5 is a drawing 500 illustrating exemplary geo distributed computing in accordance with an exemplary embodiment. Wide area network (WAN) 502 includes node A 504, node B 506, node C 508 and node D 510. In step 512 node A generates and sends a request, e.g., a request for a computing task. The request is communicated from node A 504 to node B 506, as indicated by arrow 514. The request is communicated from node A 504 to node C 508, as indicated by arrow 514'. The request is communicated from node A 504 to node D 510, as indicated by arrow 514". In some embodiments, the request is sent as a broadcast message which is received and recovered by each of the nodes (B 506, C 508 and D 510). Consider that each of the nodes (506, 508, 510) are potential computing provider devices, have downloaded a blockchain including a smart contract including multiple smart sub-contracts, and that node B 506, nodes C 508 and nodes D 510 may, and sometimes do participate in distributed computing.

In this example, node B 506, in step 516 runs the smart contract and determines a set of selected nodes to perform the requested computing task, said determined set includes node B 506 and node C 508, but does not include node D 510. Thus node B 506 determines that node B 506 has been selected to participate in performing the computing task.

In this example, node C 508, in step 518 runs the same smart contract and determines the same set of selected nodes to perform the requested computing task, said determined set includes node B 506 and node C 508, but does not include node D 510. Thus node C 508 determines that node C 508 has been selected to participate in performing the computing task.

In this example, node D 510, in step 520 runs the same smart contract and determines the same set of selected nodes to perform the requested computing task, said determined set includes node B 506 and node C 508, but does not include node D 510. Thus node D 510 determines that node D 510 has not been selected to participate in performing the computing task.

In step 522 node B 506 is operated to participate in forming a network following the topology generated from the smart contract. In step 524 node C 508 is operated to participate in forming a network following the topology generated from the smart contract. Signaling 526 and 528 is exchanged between nodes B and C (506, 508) to form a network following the topology generated from the smart contract.

Node B 506 and node C 508, are subsequently operated to perform portions of the computing task, the results are verified by nodes in the network. For example, node B computing results are verified by node C 508 and/or node D 510; and node C computing results are verified by node B 506 and/or node D 510. If the verification passes, then the computing results are communicated to the requesting device, which is node A 504.

Figure 6:
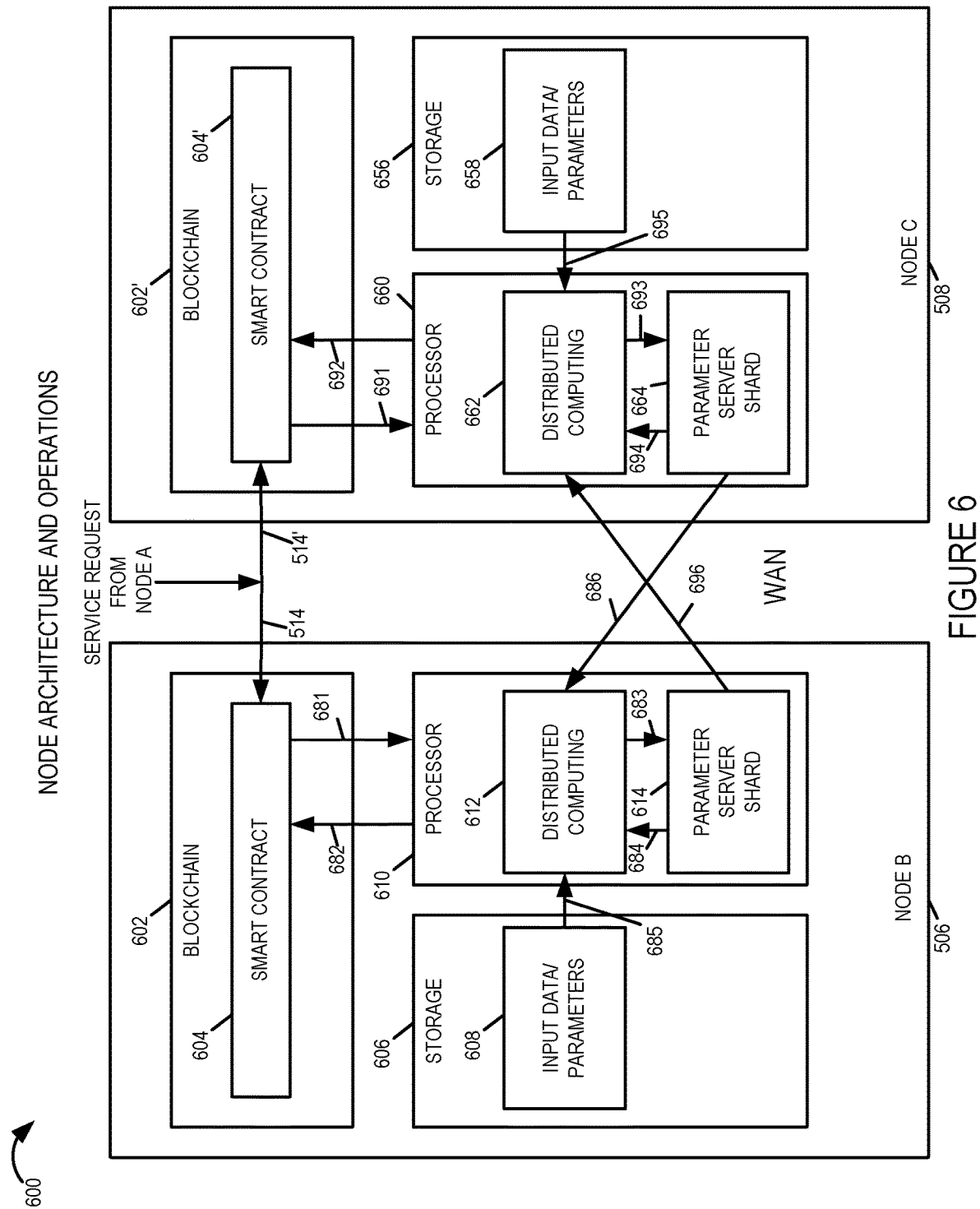
FIG. 6 is a drawing illustrating exemplary node architecture and exemplary operations in accordance with an exemplary embodiment.

FIG. 6 is a drawing 600 illustrating exemplary node architecture and exemplary operations in accordance with an exemplary embodiment. Node B 506 includes a blockchain 602 including a smart contract 604, storage 606 including input data/parameters 608 and a processor 610. Processor 610 includes component(s) 612 which performs distributed computing operations and a parameter server shard 614. Node C 506 includes a blockchain 602' including a smart contract 604', storage 656 including input data/parameters 658 and a processor 660. Processor 660 includes component(s) 662 which performs distributed computing operations and a parameter server shard 664.

The smart contract 604 of node B 506 receives the service request from node A as signal 514. The smart contract 604' of node C 508 receives the service request from node A as signal 514'. Smart contract 604 sends configuration to processor 610, as indicated by arrow 681. Smart contract 604' sends configurations to processor 660, as indicated by arrow 691.

Component 612 of processor 610 of node B 506 performs its computing operations using input data/parameters 608 and information included in parameter server shard 614 and information included in parameter server shard 664. Component 662 of processor 660 of node C 508 performs its computing operations using input data/parameters 658 and information included in parameter server shard 664 and information included in parameter server shard 614.

Results from processor 610 are returned to smart contract 604, as indicated by arrow 682. Results from processor 660 are returned to smart contract 604', as indicated by arrow 692.

Arrow 681 indicates that configuration parameters, which are generated by running the resource allocation contract component, networking contract component and security contract component in the smart contract component 604, are passed from the smart contract component 604 to the processor 610.

Arrow 691 indicates that configuration parameters, which are generated by running the resource allocation contract component, networking contract component and security contract component in the smart contract component 604', are passed from the smart contract component 604' to the processor 660.

Arrow 682 indicates that computing results of processor 610 are reported back to the smart contract 604, in which the results will be verified by the verification method of the smart contract. Arrow 692 indicates that computing results of processor 660 are reported back to the smart contract 604', in which the results will be verified by the verification method of the smart contract.

Arrow 683 indicates that intermediate computing results are passed to the parameter server shard 614, such that if the intermediate results are needed by other nodes, the intermediate results can be retrieved and used by those other nodes for their own ongoing computations. Arrow 693 indicates that intermediate computing results are passed to the parameter server shard 664, such that if the intermediate results are needed by other nodes, the intermediate results can be retrieved and used by those other nodes for their own ongoing computations.

Arrow 684 indicates that distributed computing component 612 reads parameters/intermediate results from the parameter server shard 614. Arrow 694 indicates that distributed computing component 662 reads parameters/intermediate results from the parameter server shard 664.

Arrow 685 indicates that the distributed computing component 612 receives input data, e.g., training data for a machine learning task, or parameter(s) assigned from the client. Arrow 695 indicates that the distributed computing component 662 receives input data, e.g., training data for a machine learning task, or parameter(s) assigned from the client.

Arrow 696 indicates that distributed computing component 612 reads parameters/intermediate results from the parameter server shard 664. Arrow 696 indicates that distributed computing component 662 reads parameters/intermediate results from the parameter server shard 614.

In the example shown in FIG. 6, it is assumed that parameter server architecture is used in the processors (610, 660) of the nodes (506, 508). In some embodiments, for distributed computing other system architectures can be, and sometimes are, used such as, e.g., MapReduce abstraction (e.g., Mlib, Mahout) and Graph abstraction (e.g., GraphLab, PowerGraph).

Figure 7A:
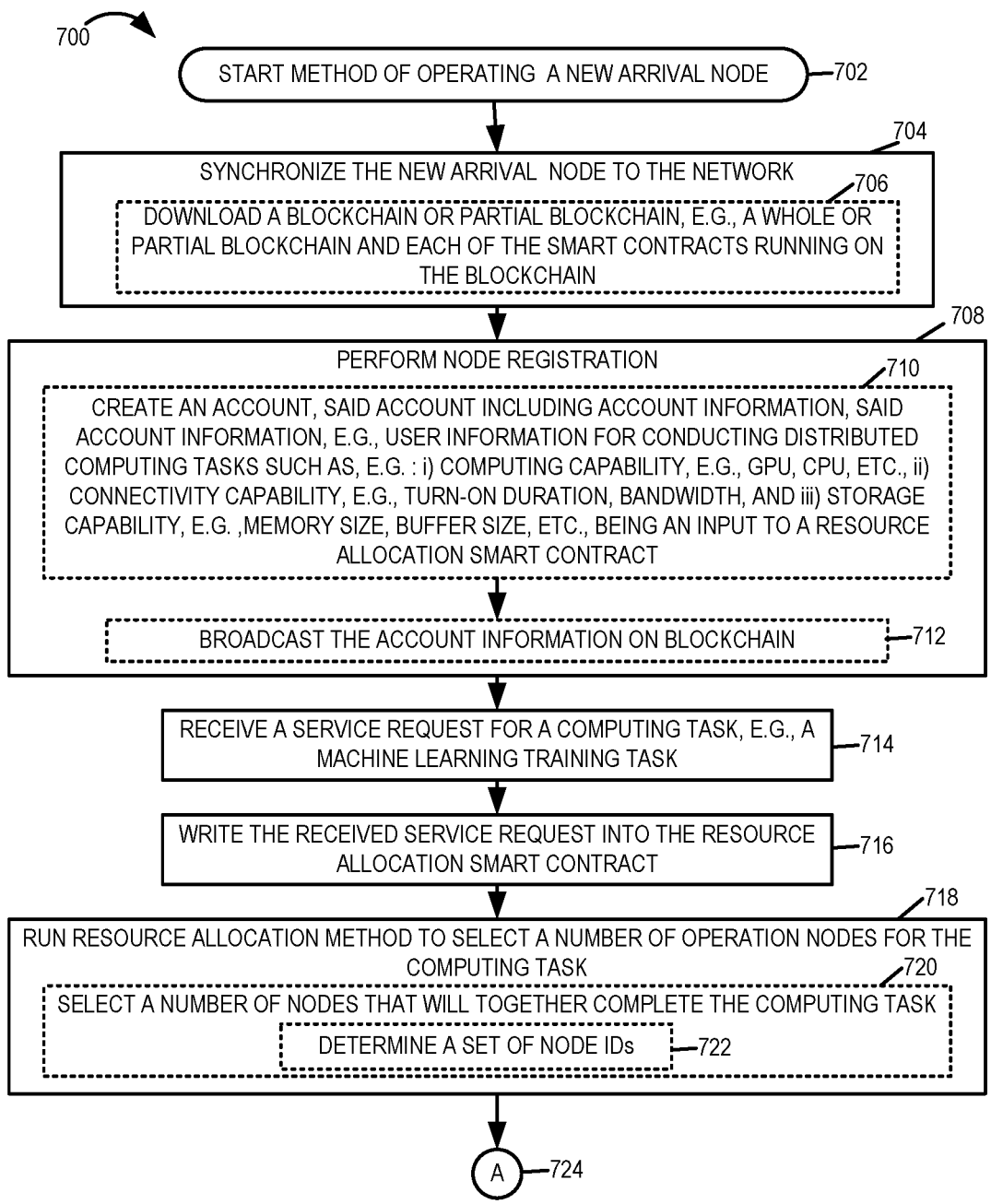
FIG. 7A is a first part of a flowchart of an exemplary method of operation a new node, e.g., a new arrival node in a computing network, in accordance with an exemplary embodiment.
Figure 7B:
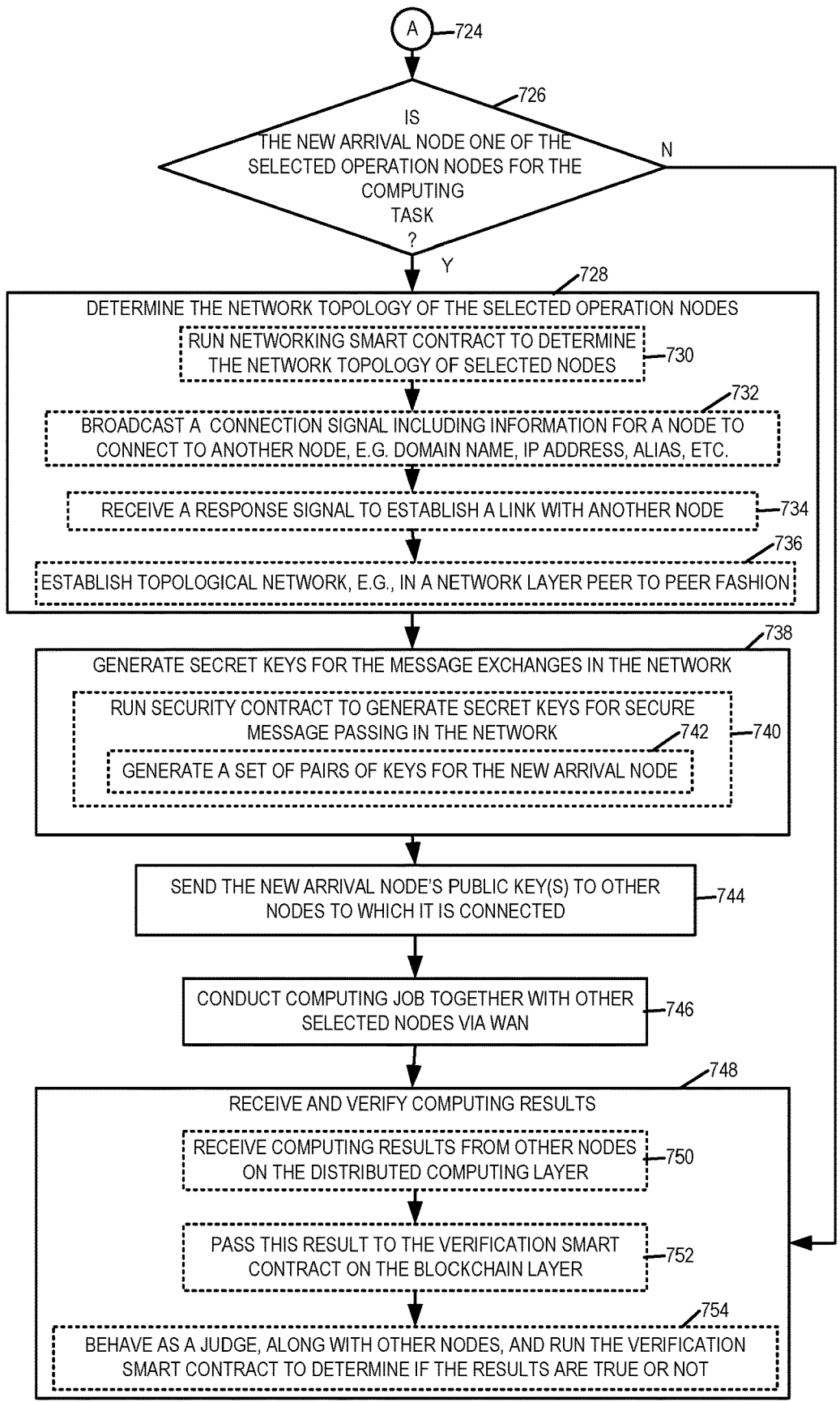
FIG. 7B is a second part of a flowchart of an exemplary method of operation a new node, e.g., a new arrival node in a computing network, in accordance with an exemplary embodiment.

FIG. 7, comprising the combination of FIG. 7A and FIG. 7B, is a flowchart 700 of an exemplary method of operation a new node, e.g., a new arrival node in a computing network, in accordance with an exemplary embodiment. Consider that the new arrival node implementing the method of the flowchart 700 of FIG. 7 is, e.g., node B 506 of FIG. 5. Operation starts in step 702 in which the new arrival node is powered on and initialized. Operation proceeds from start step 702 to step 704.

In step 704 the new arrival node synchronizes to the network. The new arrival node has decided to join the blockchain based distributed computing network and the new arrival node conducts synchronization by downloading blockchain. Step 704 includes step 706 in which the new arrival node downloads a blockchain or portion of a blockchain, e.g., a whole blockchain or partial blockchain and each of the smart contracts running on the blockchain. Operation proceeds from step 704 to step 708.

In step 708 the new arrival node performs node registration, e.g., the new arrival node registers itself to the blockchain. Step 708 includes step 710 and step 712. In step 710 the new node creates and account, said account including account information, said account information being an input to a resource allocation smart contract. In some embodiments, the account information includes, e.g., user information, e.g., necessary user information, for conducting distributed computing tasks, such as, e.g.: i) computing capability, e.g., GPU, CPU, etc., ii) connectivity capability, e.g., turn-on duration, bandwidth, etc., and iii) storage capability, e.g., memory size, buffer size, etc. Operation proceeds from step 710 to step 712, in which the new arrival node broadcasts the account information on blockchain. Since each node in the provider network owns the same copy of the smart contact, along with the requesting node, e.g. node A, registration, each of the nodes in the network are updating the same smart contract. For example node A 504, node C 508, node D 510 are able to update their copy of the smart contract based on the information broadcast in step 712 by new arrival node B 506. Operation proceeds from step 708 to step 714.

In step 714 the new arrival node receives a service request for a computing task, e.g., a machine learning (ML) training task. For example, the received service request is a service request from node A 504 which is a service request for a computing task through the blockchain, e.g. a machine learning task, This request is an input signal to the resource allocation smart contract. The request information communicated in the received request reflects the needed (estimated) computational load, For example, in machine learning training task in some embodiments, the request includes the sizes of the neural network, dataset, and the format of the data, e.g., images, voices, etc. Operation proceeds from step 714 to step 716.

In step 716 the new arrival node writes the received service request into the resource allocation smart contract.

Like each of the other nodes in the network, once the new arrival node, e.g. node B 506, receives the request, the new arrival node writes it into the resource allocation smart contract. Operation proceeds from step 716 to step 718.

In step 718 the new arrival node runs a resource allocation method to select a number of operation nodes for the computing task. Having the information for the service request and the registration information from each of the registered nodes in the network each node including the new arrival node, e.g., node B, runs the same copy of the resource allocation contract to select a number of nodes that will together complete the computing task. This node selection process is essentially based on system capability of each registered node. The output of the smart contract is a set of node IDs, such as blockchain account (i.e., a user specific public key). Step 718 includes step 720 in which the new arrival node selects a number of nodes that will together complete the computing task. Step 720 include step 722 in which the new arrival node determines a set of node IDs, e.g., blockchain account IDs, corresponding to the selected nodes that will perform the computing task. Operation proceeds from step 718, via connecting node A 724 to step 726.

In step 726 the new arrival node determines if the new arrival node is one of the selected operation nodes for the computing task. If the new arrival node determines that it is one of the selected nodes, then operation proceeds from step 726 to step 728; otherwise, operation proceeds from step 726 to step 748.

In step 728 the arrival new node determines the network topology of the selected operation nodes. Similarly, each of the other selected nodes, e.g., node C 508 in the example of FIG. 5, will run the same copy of the networking smart contract. As a consequence each of the selected nodes, e.g. node B and node C, will get a full table that describes the network topology, and the nodes that the new arrival node, e.g. node B, needs to connect to. Step 728 includes step 730, 732, 734 and 736. In step 730 the new arrival node runs a networking smart contract to determine the network topology of selected nodes. Operation proceeds from step 730 to step 732, in which the new arrival node, e.g., node B, broadcasts a connection signal including information for a node to connect to another node, e.g., domain name, IP address, alias, etc. For example, in step 732 node B broadcasts a connection signal which is received by Node C. Operation proceeds from step 732 to step 734. In step 734 the new arrival node, e.g., node B, receives a response signal to establish a link with another node. For example, in step 734 node B receives response signal from node C, which was sent to establish a link between nodes B and C. In some embodiments, the network is established in a network layer peer-to-peer fashion. Operation proceeds from step 734 to step 736, in which the new arrival node establishes a topological network, e.g., in a network layer peer to peer fashion.

The functionality of networking component, e.g., networking smart contract, is two-fold: 1) physical address identification for the selected blockchain accounts; 2) topology generation which optimizes a network topology formed by the selected nodes. These two functionalities are described below.

The first functionality of physical address identification for the selected blockchain accounts will now be described. Having the blockchain accounts, one has to first identify the physical address of these accounts. Note that one blockchain account can be, and sometimes is, associated with multiple physical computing nodes and vice versa. In blockchain, the blockchain account (recorded by all blockchain nodes) and the physical ID of a node are independent, a key fact that enables the security nature of the blockchain. Such physical ID can be domain name, IP address, alias, etc. In our case, however, in order to build a networking topology for a given distributed computing task, the physical IDs corresponding to the selected set of blockchain accounts must be known. However, the linkage between each physical ID and the blockchain account should not be known so as to prevent the hackers from directly attacking the node with high account balance. In what follows, two embodiments are provided to achieve this design goal.

Embodiment #1

(Encrypted Physical ID Exchange) Denote S as the set of selected blockchain accounts as the result of running the resource allocation component. Accounts in S encrypt their physical ID (e.g. IP address) and then exchange the information via blockchain with other accounts in S, such that only the account in S can obtain the physical IDs of all accounts in S. The encryption technique can be RSA, Diffie-Hellman key exchange or alike. We herein assume that accounts in set S are honest entities. In other words, none of them, once selected, can be a malicious node or attacker. In the end, one or more account in S inputs the collection of physical IDs to the topology generation component.

Assume that Alice, Bob and David are three selected blockchain accounts. Each of them only knows the blockchain accounts, but not the physical IDs of others. Then they use RSA-based approach to securely exchange physical IDs. We use Round Robin here. First of all, a partial order of these three accounts can be conducted according to certain rules. Say, the resulting order is Alice, Bob and David. Each of them uses RSA to generate a pair of public and private keys. Specifically, according to RSA mechanism, Alice first broadcasts her public key to all other nodes in the blockchain network. Then Bob and David use Alice's public key to encrypt their physical IDs and send the encrypted message to Alice. Alice then uses her private key to decode Bob and David's message (physical IDs). Following the round robin rule, Bob and David do the same in order. As a consequence, the three physical IDs are known by these three selected blockchain accounts while not known by others.

Embodiment #2

(Peer Discovery) First of all, each of the accounts in S agree on an identical (pre-assigned) index for a P2P protocol. Then one or more account finds other peers (e.g. IP address) in the P2P network by searching the preassigned index. Since each of the accounts in set S have an identical index, no account can be linked up to any particular physical node in discovery. By doing so, however, each of the physical IDs for blockchain accounts in S can be collected. Finally, one or more account inputs the collection of physical IDs to the topology generation component.

Different from Embodiment #1 which performs on the blockchain layer, Embodiment #2 runs on the P2P networking layer. The key idea is that all selected accounts (say, accounts in set S) replace their node IDs (e.g. blockchain account) with an identical preassigned ID and then employ peer discovery protocol to find each other's physical IDs (e.g. IP address). For instance, we use Kademlia protocol. In Kademlia, every node keeps a list of (IP-address, Port, Node ID). After running the resource allocation smart contract, every node in the blockchain network knows the selected blockchain accounts (i.e. Node ID in the triple) who will provide the computing service. Then every node will update their Kademlia list by temporarily replacing these node IDs with an identical preassigned ID. Then these nodes in set S follows the Kademlia's iterative node searching (locating) algorithm to find these preassigned IDs in the network, i.e. other peers (their IP address) in set S.

Some details about the Kademlia p2p discovery algorithm will now be described.

Kademlia uses "distance" to do node searching in the p2p network. The distance between two node IDs is defined by some metric between the node IDs.

Each node has a bucket which stores a list of neighboring nodes' IDs (say, single-hop neighbors).

The p2p discovery proceeds as follows: A node initiates a FIND_NODE request (a physical signaling) by querying to the n nodes in its own bucket that are the closest ones (i.e., ranking based on the distance) to the desired node ID. When these recipient nodes receive the request, they will look in their buckets and return the k closest nodes to the desired node ID that they know (a return signal to the requester). The requester will update a results list with the results (node ID's) he receives, keeping the k best ones (the k nodes that are closer to the searched node ID) that respond to queries. Then the requester will select these k best results and issue the request to them, and iterate this process again and again. Because every node has a better knowledge of his own surroundings than any other node has, the received results will be other nodes that are every time closer and closer to the searched node ID. The iterations continue until no nodes are returned that are closer than the best previous results.

The second functionality of topology generation which optimizes a network topology formed by the selected nodes will now be described. Topology generation: once physical IDs of the account in S are known, a topology generation method can be, and sometimes is, utilized to find an optimized topology. The topology can be a tree, ring, star, mesh or any combination thereof. The topology table, as an output of the networking component, can be, and sometimes is in the form of "key-value" pair, e.g., one line of the table being a pair of (Node index, one-hop neighbors), where the neighbors are represented by physical IDs. The nodes are then connected following the topology table in a peer-to-peer fashion. For example, if using internet, the physical ID is IP address. Then the nodes are connected via typical IP-based routing protocol.

Each of the discussions above are useful for the case of using a public blockchain, in which any entity including hackers can join and leave the platform without a need of permission. In a permissioned blockchain (e.g. Hyperledger Fabric used for enterprise), however, the access and identity of each node is highly controlled. In other words, there are no worries about the cyber-attack. This indicates that the linkage between the blockchain account and its physical IDs can be publicly known within the permissioned network. Therefore, the aforementioned first functionality—physical address identification—is no longer needed. Once a set of blockchain accounts are selected for the computing task, their physical IDs are automatically known by all.

Operation proceeds from step 728 to step 738. In step 738 the new arrival node generates secret keys for message exchanges in the network. Thus once the topological network is established, the new arrival node, e.g., node B, runs the security contract to generate secret keys to secure message passing in the network. Step 738 includes step 740 in which the new arrival node runs a security contract to generate secret keys for secure message passing in the network. Step 740 includes step 742 in which the new arrival node generate a set of pairs of keys for the new arrival node. Operation proceeds from step 738 to step 744.

In step 744 the new arrival node, e.g., node B, sends the new arrival node's public key(s) to the other nodes to which it is connected. In one example for machine learning training, one pair of public and private keys is used for the model parameter exchange and another secret key is used for the training data transfer in the network. Operation proceeds from step 744 to step 746.

In step 746 the new arrival node conducts, e.g., performs, the computing job along with other selected nodes, e.g., via WAN. Thus in step 746, the new arrival node, e.g., node B works on the computing task on the distributed computing layer along with one or more other nodes, e.g. node C. Several off-the-shelf distributed computing schemes can be used in step 746. One example for machine learning training is described with respect to FIG. 6 based on the widely used parameter server architecture. Operation proceeds from step 746 to step 748.

In step 748 the new arrival node, e.g., node B, receives and verifies the computing results. Step 748 includes step 750, 752 and 754. In step 750 the new arrival node, e.g., node B, receives computing results from other nodes, e.g., node C, on the distributed computing layer. Operation proceeds from step 750 to step 752. In step 752 the new arrival node passes this result to the verification smart contract on the blockchain layer. In step 754 the new arrival node, e.g., node B, behaves as a judge, along with other nodes, and runs the verification smart contract to determine whether or not the results are true. The other nodes behaving as judges can be, and sometimes are nodes which were not selected for the computing task. For example, with respect to the example of FIG. 5, node D may be, and sometimes is a judge. If the results are determined to be valid, the results are sent to the device which requested the computing task, e.g., node A 504 of FIG. 5, and the computing devices which performed the computing task, e.g., device B 506 and device C 508, are sent payment.

With regard to the example of FIG. 5, Node B or Node C or both obtains the results from the distributed computing component. Then Node B or Node C or both uploads the result to the verification smart contract on the blockchain. Then, each of the blockchain nodes, behaving as judges, runs the verification smart contract to determine the results true or not. Here "blockchain nodes" can be the accounts who are not selected for this computing task, for example, Node D. Remark that if the computation results itself is a big file (e.g. Gbytes), a distributed file system (e.g. InterPlanetary File System) can be used to store the result and only the hash of the results is uploaded to the verification component. To do verification, algorithms will read and process the results in the storage system using the provided hash. Once the results are verified, Node A (the client) will retrieve the results either from the verification smart contract or the storage system using hash.

In some embodiments, one or more or all of steps 706, 710, 712, 720, 722, 730, 732, 734, 736, 740, 742, 750, 752 and 754 are optional steps. An option step may be included in some embodiments, and may be omitted in other embodiments.

In some embodiments, steps 718, 726, 728, 738, and 740 include operations performed in a smart contract.

Figure 8A:
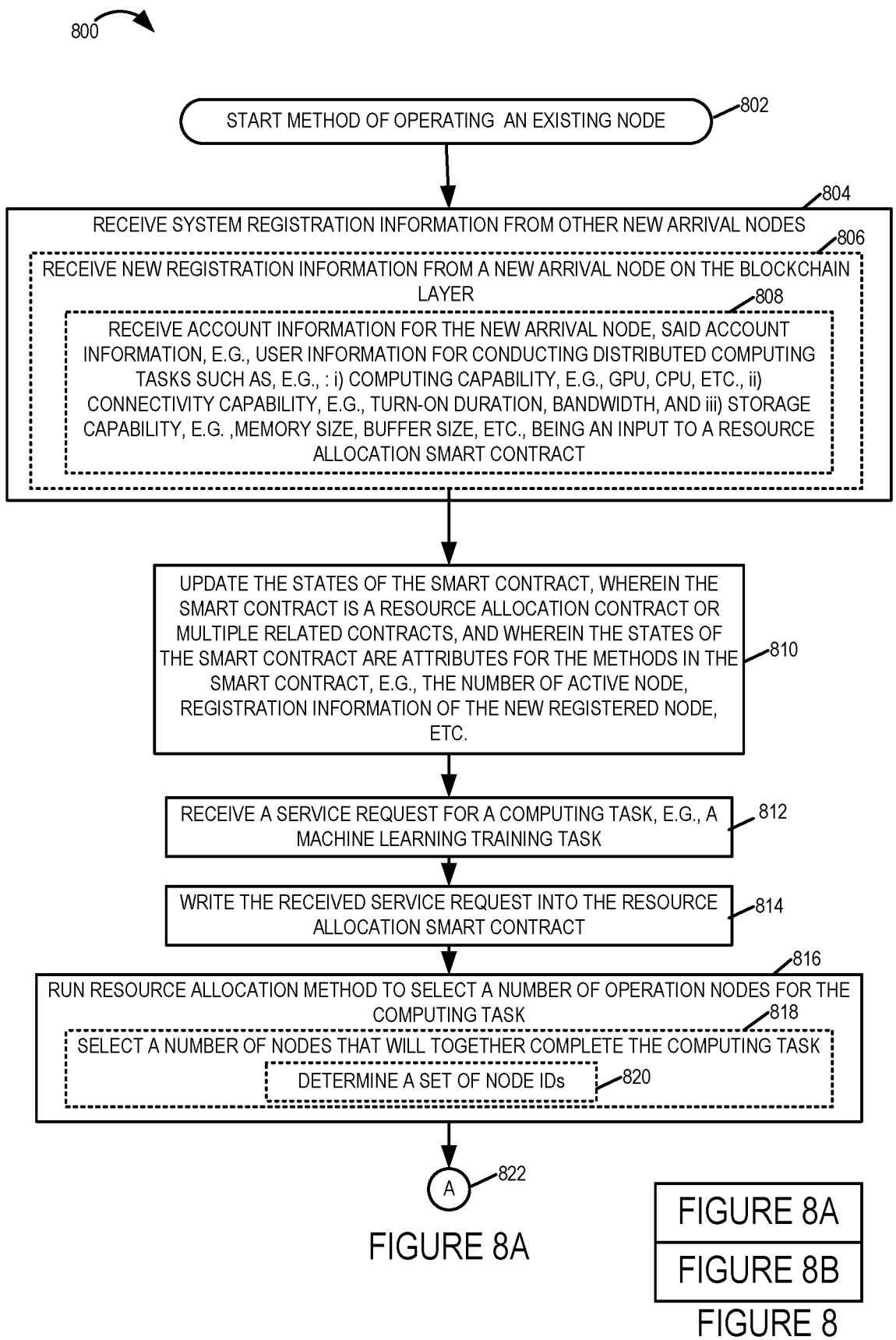
FIG. 8A, is a first part of a flowchart of an exemplary method of operation an existing node, e.g., an existing node in a computing network, in accordance with an exemplary embodiment.
Figure 8B:
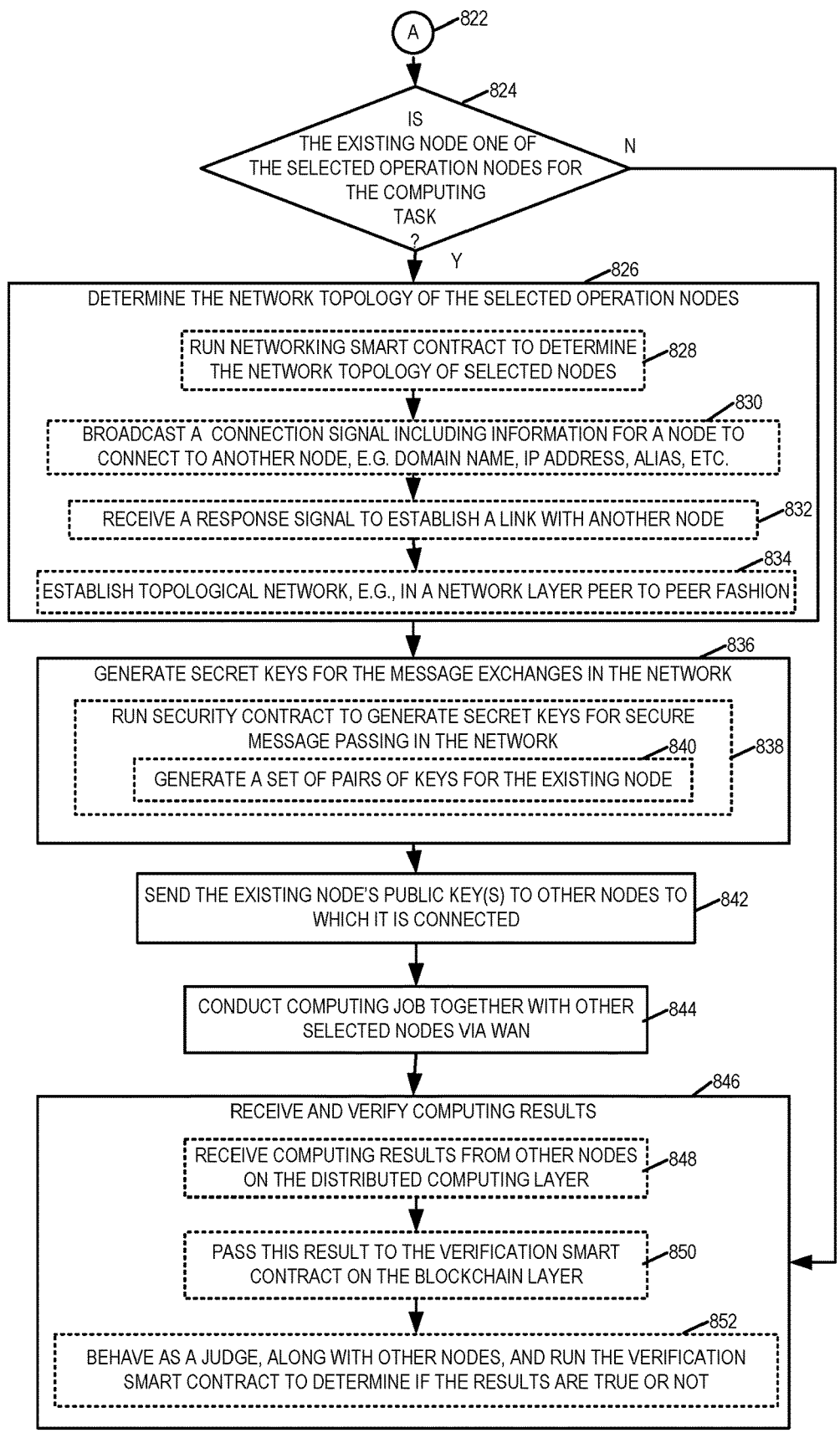
FIG. 8B is a second part of a flowchart of an exemplary method of operation an existing node, e.g., an existing node in a computing network, in accordance with an exemplary embodiment.

FIG. 8, comprising the combination of FIG. 8A and FIG. 8B, is a flowchart 800 of an exemplary method of operation an existing node, e.g., an existing node in a computing network, in accordance with an exemplary embodiment. The existing node implementing the method of the flowchart 800 of FIG. 8 is, e.g., node C 508 of FIG. 5. Operation starts in step 802 in which the existing node is powered on and initialized. Operation proceeds from start step 802 to step 804.

In step 804 the existing node receives system registration information from other new arrival nodes. Step 804 includes step 806 in which the existing node receives new registration information from a new arrival node, e.g., node B 506, on the blockchain layer. Step 806 includes step 808 in which the existing node receives account information for the new arrival node, said account information being an input to a resource allocation smart contract. In some embodiments, the received account information includes, e.g., user information, e.g., necessary user information, for conducting distributed computing tasks such as: i) computing capability, e.g., GPU, CPU, etc., ii) connectivity capability, e.g., turn-on duration, bandwidth, etc., and iii) storage capability, e.g., memory size, buffer size, etc. Operation proceeds from step 804 to step 810.

In step 810 the existing node, e.g., Node C 508, updates the states of the smart contract, wherein the smart contract is a resource allocation contract or multiple related contracts, and wherein the states of the smart contract are attributes for the methods in the smart contract, e.g., the number of active nodes, registration information of the new registered node, etc. In various embodiments, step 810 is triggered by the received new registration information of step 804. In the example of FIG. 5, in some embodiments, the smart contract which is updated is only the resource allocation contract. In some other embodiments in the example of FIG. 5, multiple related smart contracts are updated in step 810. Operation proceeds from step 810 to step 812.

In step 812 the existing node receives a service request for a computing task, e.g., a machine learning training task. Operation proceeds from step 812 to step 814.

In step 814 the existing node writes the received service request into the resource allocation smart contract. Operation proceeds from step 814 to step 816.

In step 816 the existing node runs a resource allocation method to select a number of operation nodes for the computing task. Step 816 includes step 818 in which the existing node selects a number of nodes that will together complete the computing task. Step 818 include step 820 in which the existing node determines a set of node IDs, e.g., blockchain account IDs, corresponding to the selected nodes that will perform the computing task. Operation proceeds from step 816, via connecting node A 822 to step 824.

In step 824 the existing node determines if the existing node is one of the selected operation nodes for the computing task. If the existing node determines that it is one of the selected nodes, then operation proceeds from step 824 to step 826; otherwise, operation proceeds from step 824 to step 846.

In step 826 the existing node determines the network topology of the selected operation nodes. Step 826 includes step 828, 830, 832 and 834. In step 828 the existing node runs a networking smart contract to determine the network topology of selected nodes. Operation proceeds from step 828 to step 830, in which the existing node broadcasts a connection signal including information for a node to connect to another node, e.g., domain name, IP address, alias, etc. Operation proceeds from step 830 to step 832. In step 832 the existing node receives a response signal to establish a link with another node. Operation proceeds from step 826 to step 836, in which the existing node establishes a topo-logical network, e.g., in a network layer peer to peer fashion. Operation proceeds from step 826 to step 836.

In step 836 the existing node generates secret keys for message exchanges in the network. Step 836 includes step 838 in which the existing node runs a security contract to generate secret keys for secure message passing in the network. Step 838 includes step 840 in which the existing node generates a set of pairs of keys for the existing node. Operation proceeds from step 836 to step 842.

In step 842 the existing node sends the existing node's public key(s) to the other nodes to which it is connected. Operation proceeds from step 842 to step 844.

In step 844 the existing node conducts, e.g., performs, the computing job along with other selected nodes, e.g., via WAN. Operation proceeds from step 844 to step 846.

In step 846 the existing node receives and verifies the computing results. Step 846 includes steps 848, 850 and 852. In step 850 the existing node receives computing results from other nodes on the distributed computing layer. Operation proceeds from step 848 to step 850. In step 850 the new nodes passes this result to the verification smart contract on the blockchain layer. In step 754 the existing node behaves as a judge, along with other nodes, and runs the verification smart contract to determine whether or not the results are true. If the results are determined to be valid, the results are sent to the device which requested the computing task, e.g., device A 504 of FIG. 5, and the computing devices which performed the computing task, e.g., device B 506 and device C 508, are sent payment.

In some embodiments, one or more or all of steps 806, 808, 818, 820, 828, 830, 832, 838, 840, 848, 850 and 852 are optional steps. An option step may be included in some embodiments and may be omitted in other embodiments.

In some embodiments, steps 810, 816, 824, 826, 838, and 840 include operations performed in a smart contract.

Figure 9A:
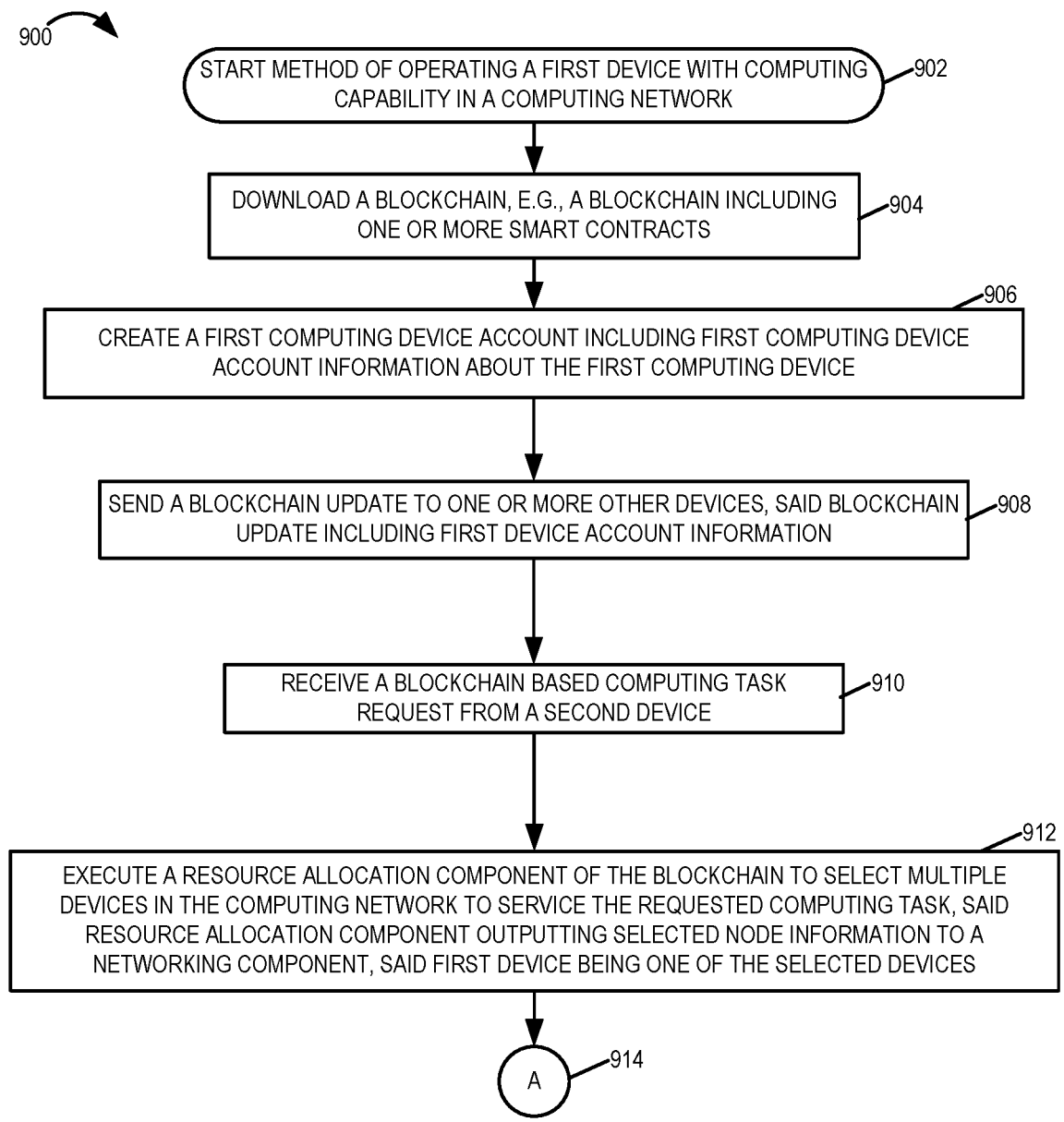
FIG. 9A is a first part of a flowchart of an exemplary method of operating a first device with computing capabilities in a computing network in accordance in an exemplary embodiment.
Figure 9B:
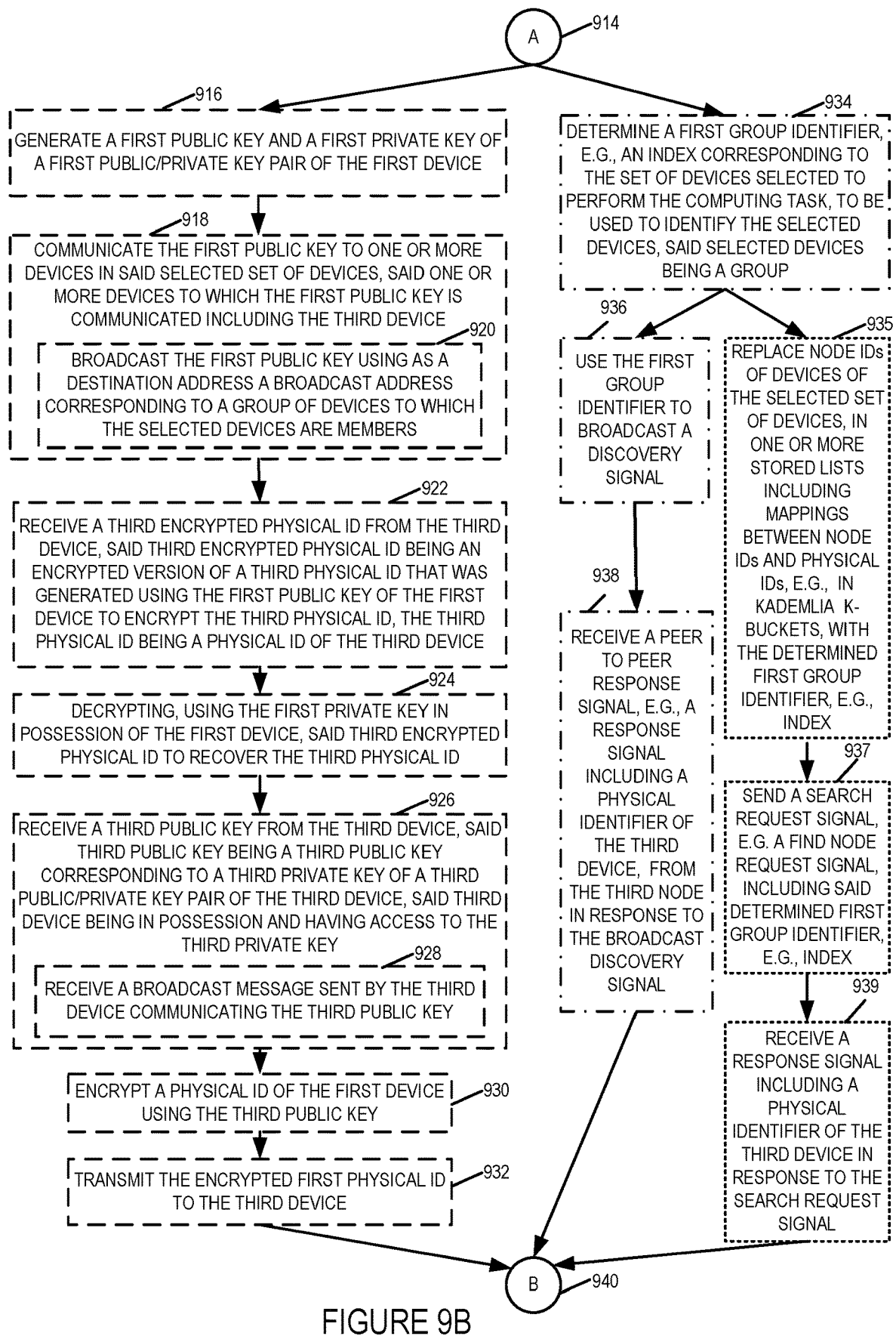
FIG. 9B is a second part of a flowchart of an exemplary method of operating a first device with computing capabilities in a computing network in accordance in an exemplary embodiment.

FIG. 9, comprising the combination of FIG. 9A, FIG. 9B and FIG. 9C, is a flowchart 900 of an exemplary method of operating a first device with computing capabilities in a computing network in accordance in an exemplary embodiment. In one exemplary embodiment, the first device is device B 506 of FIG. 5. Operation starts in step 902 in which the first device is powered on and initialized. Operation proceeds from step 902 to step 904.

In step 904 the first device downloads a blockchain. In some embodiments, the blockchain includes one or more smart contracts. Operation proceeds from step 904 to step 906.

In step 906 the first device creates a first computing device account including first computing device account information about the first computing device. First computing device account information includes, e.g., processing capability information, memory information, and maximum file storage size information. Operation proceeds from step 906 to step 908.

In step 908, the first device sends a blockchain update to one or more other devices, said blockchain update including first device account information. Operation proceeds from step 908 to step 910.

In step 910 the first device receives a blockchain based computing task request from a second device, e.g., a requesting device. In one embodiment, the second device is node A 504 of FIG. 5. Operation proceeds from step 910 to step 912.

In step 912 the first device executes a resource allocation component, e.g., a smart contract portion, of the blockchain to select multiples devices in the computing network to service the requested computing task, said resource allocation component outputting selected node information, e.g., node IDs, blockchain account ID or other information identifying the selected compute nodes, to a networking component, e.g., a networking smart contract, said first device being one of the selected devices. In one exemplary embodiment, the selected multiple devices to service the request are device B 506 and device C 508 of FIG. 5. Operation proceeds from step 912, via connecting node A 914 to step 916 or step 934.

In some embodiments, steps 916, 918, 922, 924, 926, 930 and 932 are performed. In some other embodiments, steps 934, 936 and 938 are performed. In some other embodiments, steps 934, 935, 937 and 939 are performed.

In step 916, the first device generates a first public key and a first private key of a first public/private key pair of the first device. Operation proceeds from step 916 to step 918. In step 918 the first device communicates the first public key to one or more devices, said one or more devices to which the first public key is communicated including the third device. In some embodiments, the third device is node C 508 of FIG. 5. In some embodiments, step 918 includes step 920, in which the first device broadcasts the first public key using as a destination address a broadcast address corresponding to a group of devices to which the selected device are members. Operation proceeds from step 920 to step 922. In step 922 the first device receives a third encrypted physical ID, said third encrypted physical ID being an encrypted version of a third physical ID that was generated using the first public key of the first device to encrypt the third physical ID, the third physical ID being a physical ID of the third device. In some embodiments, the third physical ID is one of an IP address of the third device, domain name corresponding to the third device, pre-assigned alias of the third device or MAC address of the third device. Operation proceeds from step 922 to step 924. In step 924 the first device decrypts, using the first private key in possession of the first device, said third encrypted physical ID to recover the third physical ID. In various embodiments, devices which were not selected to service the requested computing task do not have access to the first private key required to decrypt the third encrypted physical ID, and the first device has access to the first private key required to decrypt the third encrypted physical ID.

Operation proceeds from step 924 to step 926. In step 926 the first device receives a third public key from the third device, said third public key corresponding to a third private key of a third public/private key pair of the third device, said third device being in possession and having access to the third private key. In some embodiments, step 926 includes step 928 in which the first device receives a broadcast message send by the third device communicating the third public key. Operation proceeds from step 926 to step 930. In step 930, the first device encrypts a first physical ID of the first device using the third public key. Operation proceeds from step 930 to step 932, in which the first device transmits the encrypted first physical ID to the third device. Operation proceeds from step 932, via connecting node B 940, to step 941.

Returning to step 934, in step 934, the first device determines a first group identifier, e.g., an index corresponding to the set of devices selected to perform the computing task, to be used to identify the selected devices, said selected devices being a group. In some embodiments, operation proceeds from step 934 to step 936. In some other embodiments, operation proceeds from step 934 to step 935. In step 936 the first device uses the first group identifier to broadcast a discovery signal. Operation proceeds from step 936 to step 938, in which the first device receives a peer to peer response signal, e.g., a response signal including a physical identifier of the third device, from the third node in response to the broadcast discovery signal. Operation proceeds from step 938, via connecting node B 940 to step 941.

Returning to step 935, in step 935, the first device replaces node IDs of devices in the selected set of devices in one or more stored lists including mappings between node IDs and physical IDs, e.g., in Kademlia k-buckets, with the determined first group identifier, e.g., the determined index. Operation proceeds from step 935 to step 937. In step 937 the first device sends a search request signal, e.g., a find node request signal, including said determined first group identifier, e.g., index. Operation proceeds from step 937 to step 939. In step 939 the first device receives a response signal including a physical identifier of the third device in response to the search request signal. Operation proceeds from step 939, via connecting node B 940, to step 941.

In step 941 the first device operates the networking component to generate a set of network topology information for the selected devices and to control the first device to use information in the generated set of network topology information to establish a communications connection with a third device, e.g., another compute node, said third device being one of the plurality of devices selected to service the requested computing task. In one exemplary embodiment the third device is device C 508. In some embodiments, step 941 includes step 942 in which the first device communicates with the third device using the third physical identifier (ID) as a destination address of a unicast communication. Operation proceeds from step 941 to step 943.

In step 943 the first device is operated to work on a portion of the requested computing task and to generate a first computing result portion. Operation proceeds from step 943 to step 944. In step 944 the first device broadcasts a blockchain update, e.g., a blockchain synchronization signal, to provide the first computing result portion to other devices implementing the blockchain. Step 944 includes step 945 and 946. In step 944 the first device is operated to provide the computing results, e.g., the generated first computing result portion, to the second device. In step 946 the first device sends the first computing result portion to a fourth device which performs a verification operation. In one exemplary embodiment, the fourth device is node D 510 of FIG. 5. Operation proceeds from step 944 to step 947.

In step 947 the first device is operated to receive a second computing result portion from the third device. Operation proceeds from step 947 to step 920. Operation proceeds from step 947 to step 948. In step 948 the first device performs a result verification operation. Step 948 includes step 949, in which the first device is operated to verify the received second computing result portion. Operation proceeds from step 948 to step 950. In step 950, the first device broadcasts the results of the verification of the second computing result portion to other devices implementing the blockchain. Operation proceeds from step 950 to step 951.

In step 951 the first device receives a computing verification result from the fourth device. Operation proceeds from step 951 to step 952. In step 952 the first device determines if one or more of the computing verification results indicates a verification failure. If the determination of step 952 is that one or more of the computing verification results indicates a verification failure, then operation proceeds from step 952 to step 962 in which the first device selects a new set of devices to perform at least a portion of the requested computing operation when said computing verification results indicates an invalid computing result. In some embodiments, the selection of the new set of devices to perform at least a portion of the computing task does not allow a device, which performed a computing portion which failed verification, to be included in the new set.

If the determination of step 952 is that the computing verification results indicate a successful verification, then operation proceeds from step 952 to step 960 in which the first device accepts compensation for computing when said verification result indicates a valid computing result. In some embodiments, each of the computing result portions corresponding to the result have to pass verification before the set of computing results are accepted by the second device. In some embodiments, an individual computing result portion corresponding to the result which passes verification is individually accepted by the second device. In some embodiments, the first device is compensated for a computing task portion, which it performed, following successful verification of the individual computing task portion. In some embodiments, the first device is compensated for a computing task portion, which it performed, following verification of the complete set of computing task portions corresponding to the task.

In some embodiments, a computing task portion, corresponding to a computing result portion which failed verification is reassigned to a different computing device to perform the computing task and the result is subjected to verification. In some embodiments, multiples devices serving as judges perform verification on a computing result portion and each of the judges needs to confirm a valid computing result before the computing result is declared valid and is accepted by the second device.

Figure 10:
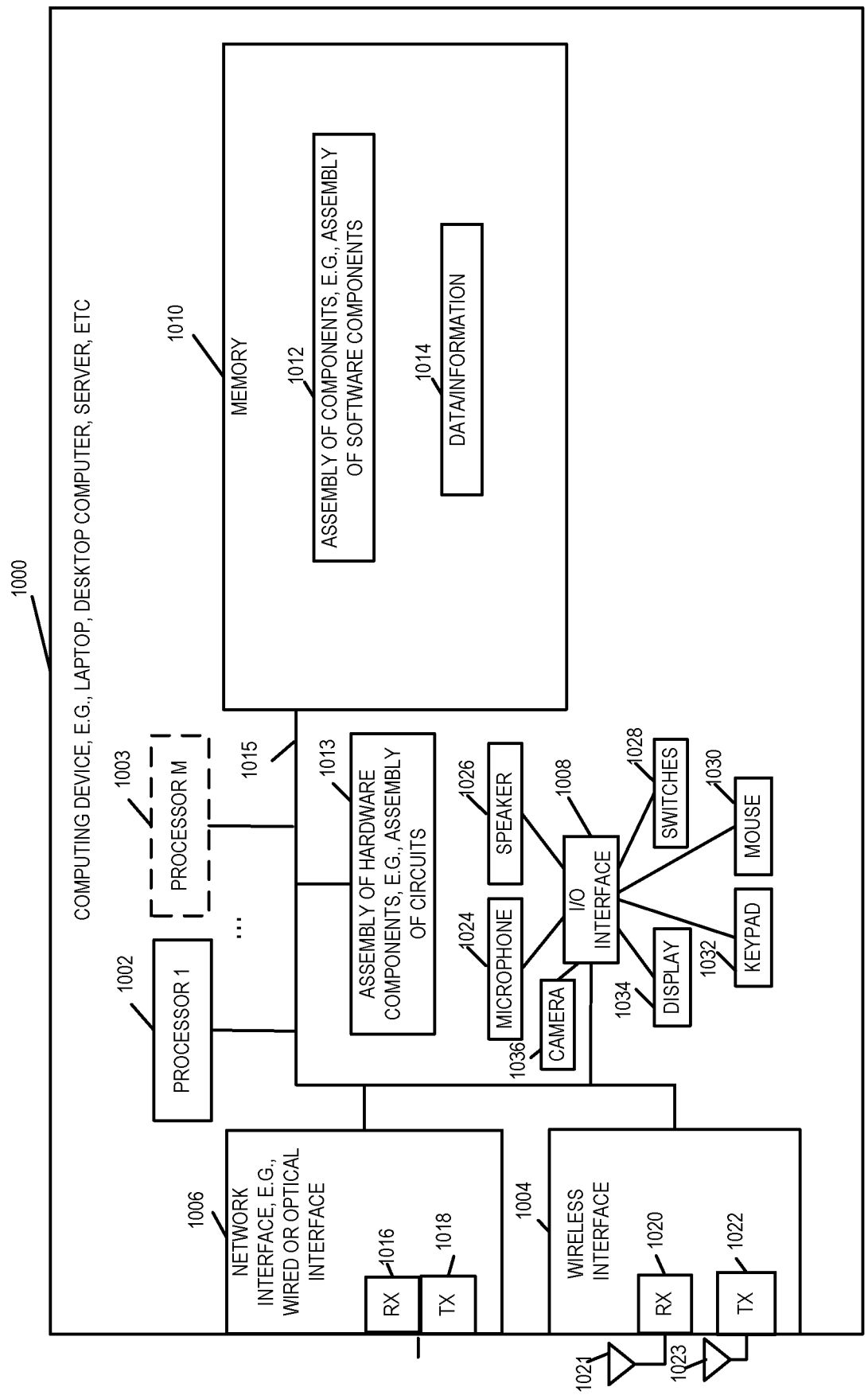
FIG. 10 is a drawing of an exemplary computing device, e.g., a server, laptop, desktop computer, notepad computer, etc., in accordance with an exemplary embodiment.

FIG. 10 is a drawing of an exemplary computing device 1000, e.g., a server, laptop, desktop computer, notepad computer, etc., in accordance with an exemplary embodiment. Exemplary computing device 1000 is, e.g., any of client device 1 102, provider computing device 2 106, provider computing device N 108, provider computing device 110 of FIG. 1 or FIG. 2; any of selected provider 1 306, selected provider 2 308, selected provider n 310 of FIG. 3 or FIG. 4, any of node A 504, node B 506, node C 508, node D 510 of FIG. 5 or FIG. 6; a new arrival node implementing the method of FIG. 7; an existing node implementing the method of FIG. 8; any of first, second, third or fourth device implementing steps of a method described with respect to FIG. 9; or a node implementing steps of a method described with respect to the example of FIGS. 13-16.

Computing device 1000 includes one or more processors (processor 1 1002, . . . , processor M 1003), wireless interface 1004, network interface 1006, e.g., a wired or optical interface, I/O interface 1008, memory 1010, and an assembly of hardware components 1013, e.g., assembly of circuits, coupled together via a bus 1015 over which the various elements may interchange data and information. Wireless interface 1004 includes a wireless receiver 1020 coupled to receive antenna 1021, via which the computing device may receive wireless signals from other devices. Wireless interface 1004 further includes a wireless transmitter 1022 coupled to transmit antenna 1023, via which the computing device may transmit wireless signals from other devices. In some embodiments, the same antenna is used for the receiver and transmitter. Network interface 1006 includes a receiver 1016 via which the computing device 1000 may receive signal from other devices, e.g., over a wired backhaul connection. Network interface 1006 includes a transmitter 1018 via which the computing device 1000 may transmit signals to other devices, e.g., over a wired backhaul connection.

Memory 1010 includes an assembly of components 1012, e.g., an assembly of software components, and data/information 1014. Computing device 1000 further includes a plurality of input/output devices, microphone 1024, speaker 1026, switches 1028, mouse 1030, keypad 1032, display 1034, and camera 1036, coupled to I/O interface 1008.

Figure 11A:
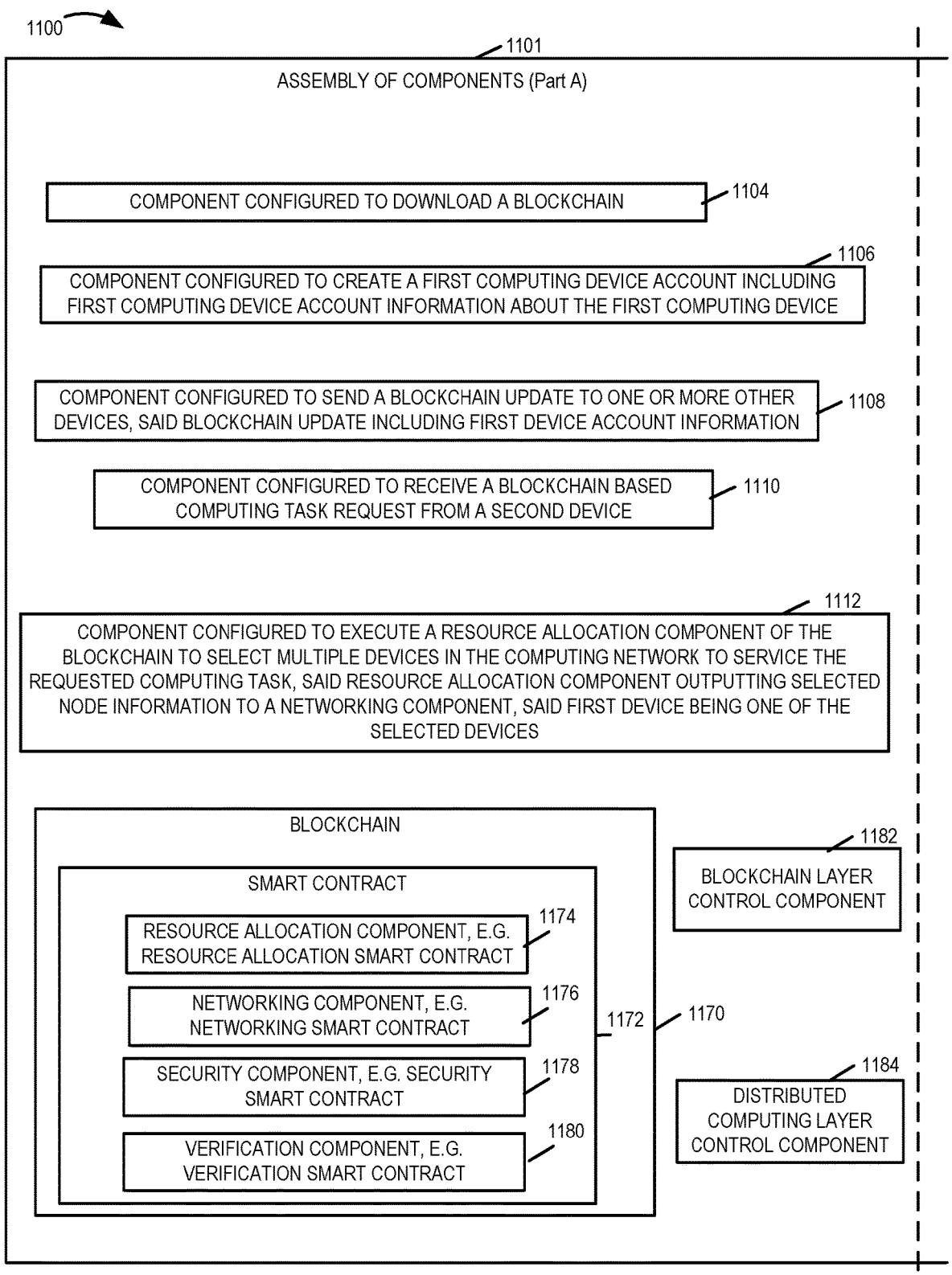
FIG. 11A is a first part of a drawing of an exemplary assembly of components in accordance with an exemplary embodiment.
Figure 11B:
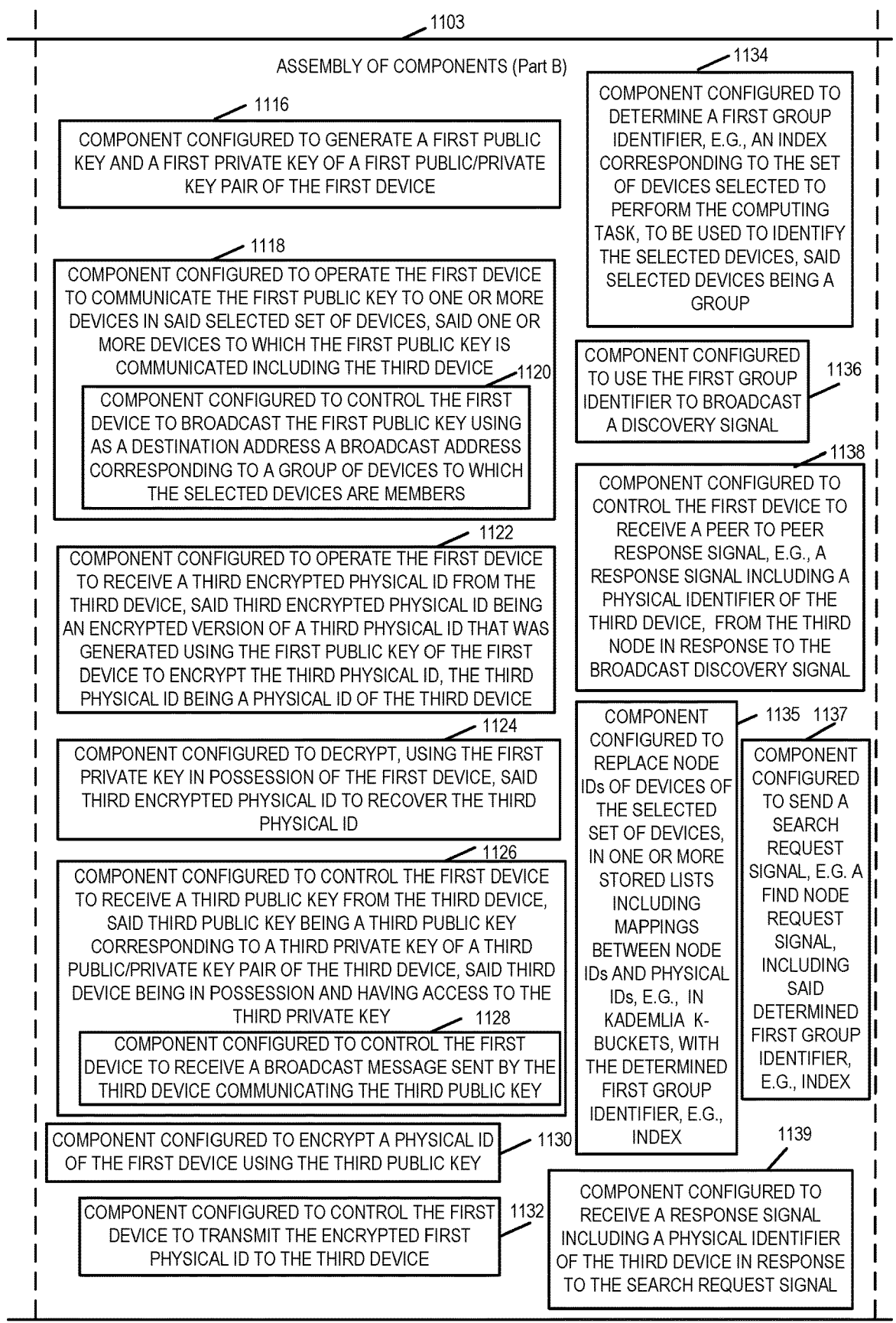
FIG. 11B is a second part of a drawing of an exemplary assembly of components in accordance with an exemplary embodiment.

FIG. 11, comprising the combination of FIG. 11A, FIG. 11B and FIG. 11C, is a drawing of an exemplary assembly of components 1100, comprising Part A 1101, Part B 1103 and Part C 1105, in accordance with an exemplary embodiment. Assembly of components 1100 is, e.g. included in computing device 1000 of FIG. 10.

Assembly of components 1100 can be, and in some embodiments is, used in computing device 1000 of FIG. 10. The components in the assembly of components 1100 can, and in some embodiments are, implemented fully in hardware within the processor 1002, e.g., as individual circuits. The components in the assembly of components 1100 can, and in some embodiments are, implemented fully in hardware within the assembly of components 1013, e.g., as individual circuits corresponding to the different components. In other embodiments some of the components are implemented, e.g., as circuits, within the processor 1002 with other components being implemented, e.g., as circuits within assembly of components 1013, external to and coupled to the processor 1002. As should be appreciated the level of integration of components on the processor and/or with some components being external to the processor may be one of design choice. Alternatively, rather than being implemented as circuits, all or some of the components may be implemented in software and stored in the memory 1010 of the computing device 1000, with the components controlling operation of the computing device to implement the functions corresponding to the components when the components are executed by a processor, e.g., processor 1002. In some such embodiments, the assembly of components 1100 is included in the memory 1010 as assembly of components 1012. In still other embodiments, various components in assembly of components 1100 are implemented as a combination of hardware and software, e.g., with another circuit external to the processor providing input to the processor 1002 which then under software control operates to perform a portion of a component's function. While processor 1002 is shown in the FIG. 10 embodiment as a single processor, e.g., computer, it should be appreciated that the processor 1002 may be implemented as one or more processors, e.g., computers. In embodiments, computing device 1000 includes multiple processors, e.g. processor 1002 and processor M 1003.

When implemented in software the components include code, which when executed by the processor 1002, configure the processor 1002 to implement the function corresponding to the component. In embodiments where the assembly of components 1100 is stored in the memory 1010, the memory 1010 is a computer program product comprising a computer readable medium comprising code, e.g., individual code for each component, for causing at least one computer, e.g., processor 1002, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 11 control and/or configure the computing device 1000, or elements therein such as the processor 1002, to perform the functions of corresponding steps illustrated and/or described in the method of one or more of the flowcharts, signaling diagrams and/or described with respect to any of the Figures. Thus the assembly of components 1100 includes various components that perform functions of corresponding one or more described and/or illustrated steps of an exemplary method, e.g., steps of the method of flowchart 700 of FIG. 7, the method of flowchart 800 of FIG. 8, the method of flowchart 900 of FIG. 9, steps of FIG. 18, steps of FIG. 18, steps of FIG. 19, and/or described or shown with respect to any of the other figures.

Assembly of components 1100 includes a component 1104 configured to download a blockchain, a component 1106 configured to create a first computing device account including first computing device account information about the first computing device, a component 1108 configured to send a blockchain update to one or more other devices, said blockchain update including first device account information, and a component 1110 configured to receive a blockchain based computing task request from a second device.

Assembly of components 1100 further includes a component 1112 configured to execute a resource allocation component of the blockchain to select multiple devices in the computing network to service the requested computing task, said resource allocation component outputting selected node information to a networking component, said first device being one of the selected devices.

Assembly of components 1100 further includes a blockchain 1170, a blockchain control component 1182 and a distributed computing layer control component 1184. Blockchain 1170 includes a smart contract 1172. Smart contract 1172 includes a resource allocation component 1174, e.g., a resource allocation smart contract, a networking component 1176, e.g., a networking smart contract, a security component 1178, e.g., a security smart contract, and a verification component 1180, e.g., a verification smart contract. Assembly of components 1100 further includes a component 1116 configured to generate a first public key and a first private key of a first public/private key pair of the first device, and a component 1118 configured to operate the first device to communicate the first public key to one or more devices in said selected set of devices, said one or more devices to which the first public key is communicated including the third device. Component 1118 includes a component 1120 configured to control the first device to broadcast the first public key using as a destination address a broadcast address corresponding to a group of devices to which the selected devices are members. Assembly of components 1100 further includes a component 1122 configured to operate the first device to receive a third encrypted physical ID from the third device, said third encrypted physical ID being an encrypted version of a third physical ID that was generated using the first public key of the first device to encrypt the third physical ID, the third physical ID being a physical ID of the third device, a component 1124 configured to decrypt, using the first private key in possession of the first device, said third encrypted physical ID to recover the third physical ID. Assembly of components 1100 further includes a component 1126 configured to control the first device to receive a third public key from the third device, said third public key being a third public key corresponding to a third private key of a third public/private key pair, said third device being in possession and having access to the third private key. Component 1126 includes a component 1128 configured to control the first device to receive a broadcast message sent by the third device communicating the third public key. Assembly of component 1100 further includes a component 1130 configured to encrypt a physical ID of the first device using the third public key, and a component 1132 configured to control the first device to transmit the encrypted first physical ID to the third device.

Assembly of components 1100 further includes a component 1134 configured to determine a first group identifier, e.g., an index corresponding to the set of devices selected to perform the computing task to be used to identify the selected devices, said selected devices being a group, a component 1136 configured to use the first group identifier to broadcast a discovery signal, and a component 1138 configured to control the first device to receive a peer to peer response signal, e.g., a response signal including a physical identifier of the third devices, from the third device in response to the broadcast discovery signal.

Assembly of components 1100 further includes a component 1135 configured to replace node IDs, e.g. blockchain account IDs, of devices of the selected set of devices, in one ormer stored lists including mappings between node IDs and physical IDs, e.g. in Kademlia k-buckets, with the determined first group identifier, e.g. index, a component configured to send a search request, e.g., a Find Node request signal including said determined group identifier, e.g., index, and a component 1139 configured to receive a response signal including a physical identifier of the third device in response to said search request signal.

Assembly of components 1100 further includes a component 1141 configured to operate the networking component to generate a set of network topology information for the selected devices and to control the first device to use information in the generated set of network topology information to establish a communications connection with a third device, said third device being one of the plurality of devices selected to service the requested computing task, a component 1142 configured to operate the first device to communicate with the third device using the third physical identifier as a destination address of a unicast communication, and a component 1143 configured to operate the first device to work on a portion of the requested computing task and to generate a first computing result portion, and a component 1144 configured to operate the first device to broadcast a blockchain update, e.g., a blockchain synchronization signal, to provide the first computing result portion to other devices implementing the blockchain. Component 1144 includes a component 1145 configured to operate the first device to provide computing results to the second device and a component 1146 configured to send the first computing result portion to a fourth device which performs a verification operation.

Assembly of components 1100 further includes a component 1147 configured to operate the first device to receive a second computing result portion from the third device, and a component 1148 configured to perform a result verification operation. Component 1148 includes a component 1149 configured to operate the first device to verify the received second computing result portion. Assembly of components 1100 further includes a component 1150 configured to operate the first device to broadcast results of the verification of the second computing result portion to other devices implementing the blockchain, and a component 1151 configured to receive a computing verification result from the fourth device in a broadcast blockchain update transmitted by the fourth device, Assembly of components 1100 further includes a component 1152 configured to determine if one or more of the computing verification results indicate a verification failure to control operation as a function of the determination, a component 1162 configured to select a new set of devices to perform at least a portion of the requested computing operation when said computing verification result indicates an invalid computing result, and a component 1160 configured to operate the first device to accept compensation for computing when said verification result indicates a valid computing result.

Figure 17:
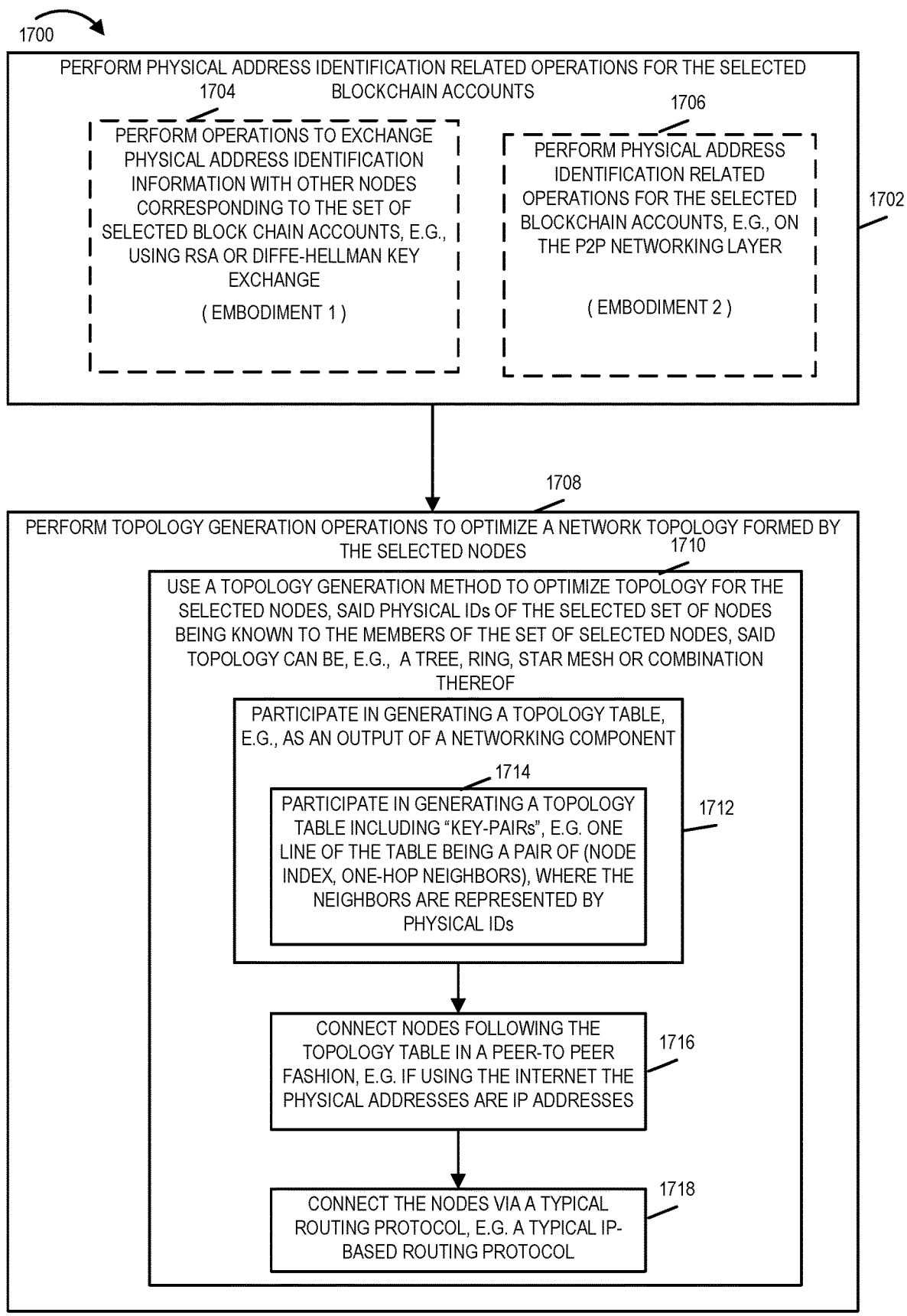
FIG. 17 illustrates a flowchart portion of an exemplary method including steps to perform physical address identification operations for selected nodes and to perform topology generation operations, e.g., to form and optimize a network of the selected nodes, in accordance with various exemplary embodiments.
Figure 18:
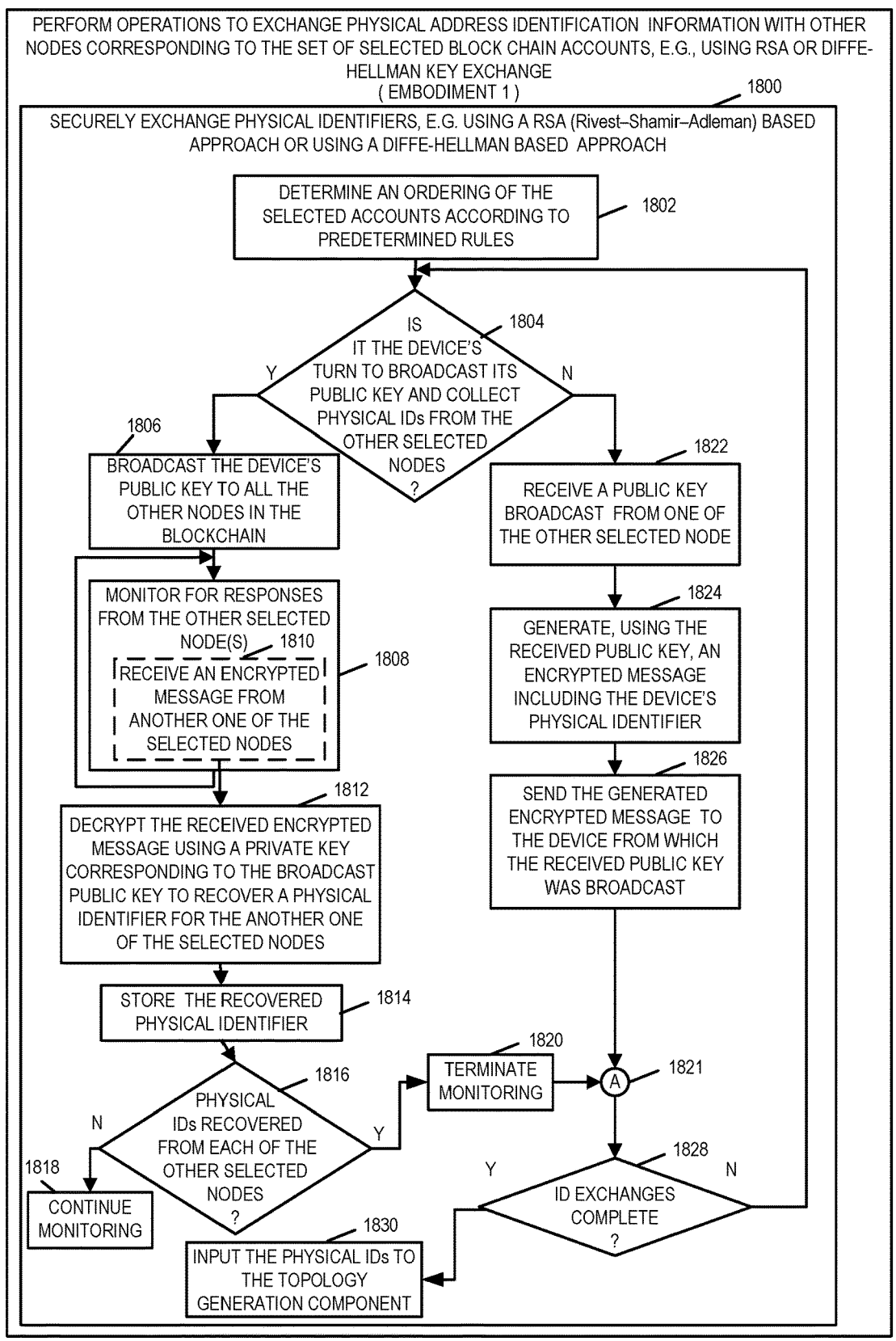
FIG. 18 is a drawing of exemplary flowchart portion of an exemplary method including steps to perform operations to exchange physical address identification information with other nodes corresponding to a set of selected blockchain accounts, e.g., using a key exchange, in accordance with various exemplary embodiments.
Figure 19:
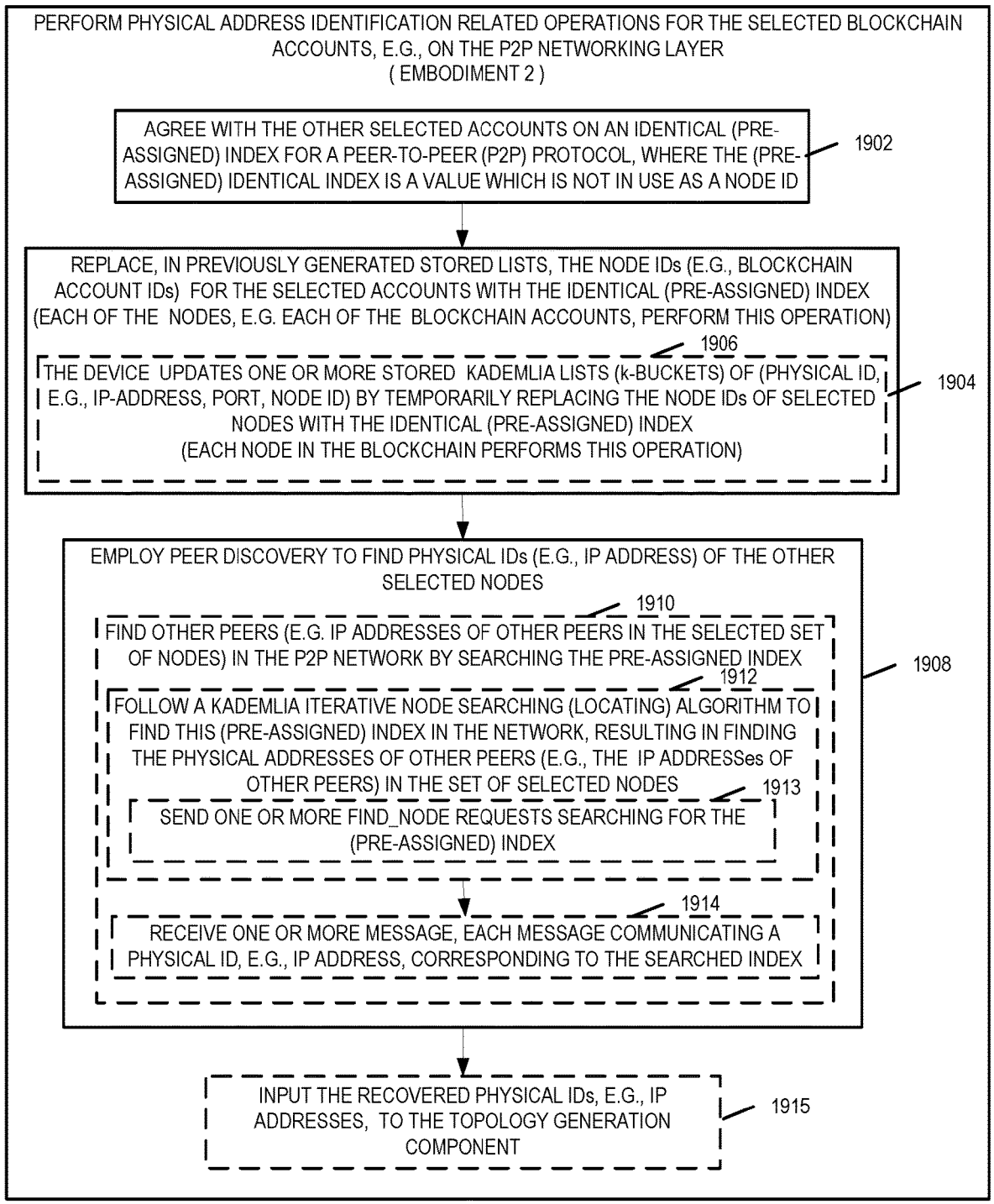
FIG. 19 is a drawing of exemplary flowchart portion of an exemplary method including steps to perform operations to perform physical address identification operations for a set of selected blockchain accounts, e.g., using peer to peer signaling and an identical index for the selected accounts.

In some embodiments, assembly of components 1100 further includes additional components, e.g., additional individual components corresponding to each of the steps of flowchart 700 of FIG. 7, flowchart 800 of FIG. 8, and the steps of flowcharts portions of FIGS. 17, 18 and 19, which are each configured to implement a step.

Figure 12:
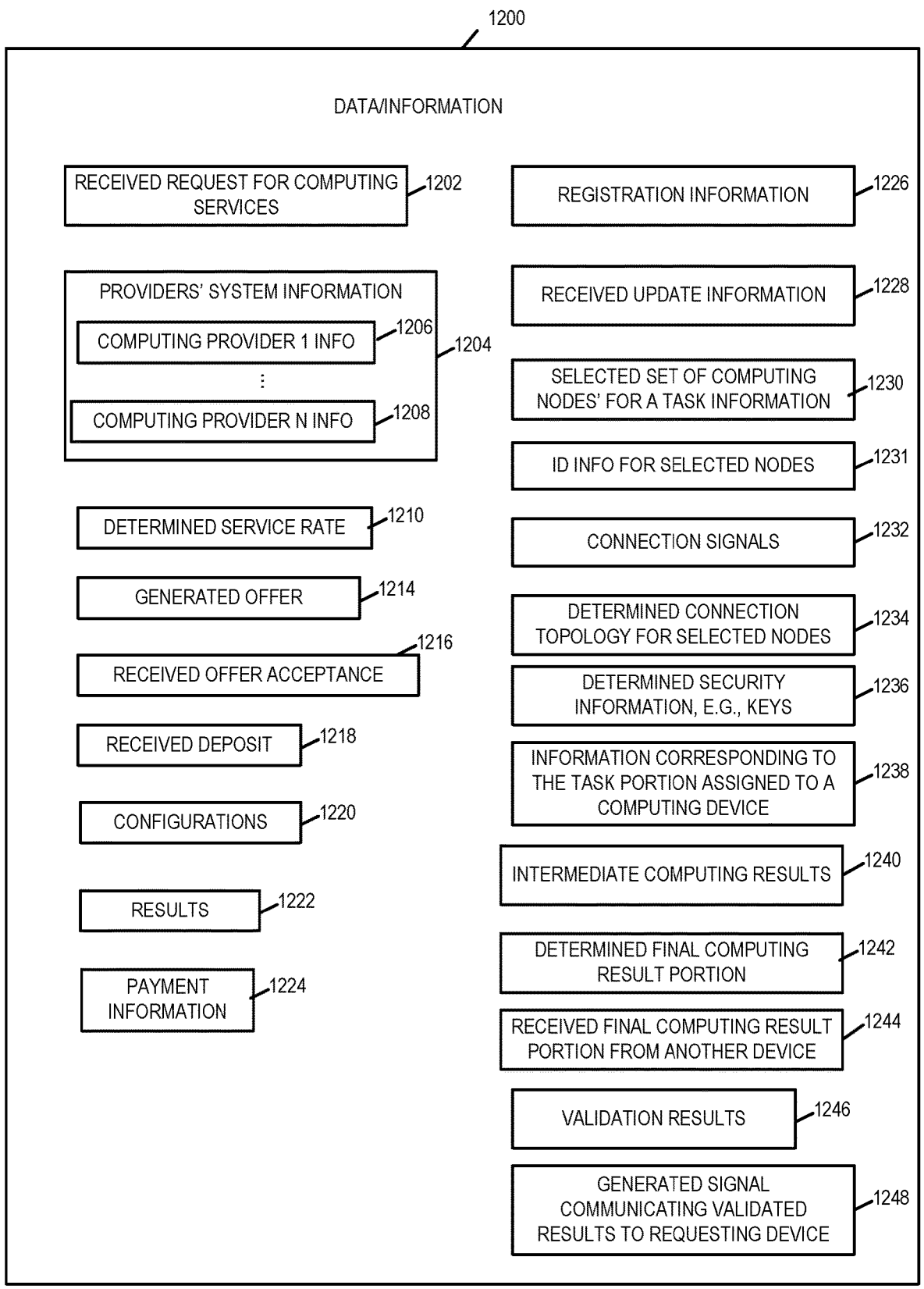
FIG. 12 is a drawing of exemplary data/information in accordance with an exemplary embodiment.

FIG. 12 is a drawing of exemplary data/information 1200 in accordance with an exemplary embodiment. Data/information 1200 is, e.g. included in computing device 1000 of FIG. 10. Data/information 1200 includes a received request for computing services 1202, and providers' system information 1204. Providers' system information 1204 including information corresponding to a plurality of computing providers (computer provider 1 information 1206, . . . , computer provider N information 1208). Data/information 1200 further includes a determined service rate 1210, a generated offer 1214, a received offer acceptance response 1216, a received deposit 1218, results 122, and payment information 1224. Data/information 1200 further includes registration information 1226, received update information 1228, selected set of computing nodes for a task information 1230, ID information for the selected nodes 1231, connection signals 1232, determined connection topology for the selected nodes 1234, determined security information 1236, e.g. keys, information corresponding to the task portion assigned to a computing device 1238, intermediate computing results 1240, determined final computing results 1242, received final computing result portion(s) from other devices 1244, validation results 1246, and generated signal communicating validated results to requesting device 1248.

FIG. 17 is a drawing of a flowchart portion 1700 illustrating exemplary steps (1702, 1704) which may be, and sometimes are, performed by a computing device, e.g., node B or node C of FIG. 5, implementing an exemplary method in accordance with an exemplary embodiment.

In one exemplary embodiment, flowchart portion 1700 including both steps 1702 and 1708 replaces step 728 in flowchart 700 of FIG. 7, and the steps 1702 and 1708 are performed by the new arrival node performing the method of flowchart 700 of FIG. 7.

In another exemplary embodiment, flowchart portion 1700 including both steps 1702 and 1708 replaces step 826 in flowchart 800 of FIG. 8, and the steps 1702 and 1708 are performed by the existing node performing the method of flowchart 800 of FIG. 8.

In another exemplary embodiment, flowchart portion 1700 step 1702 of FIG. 17 replaces the steps of FIG. 9B in flowchart 900 of FIG. 9, flowchart portion 1700 step 1708 of FIG. 17 is included as part of step 941 of FIG. 9C in flowchart 900 of FIG. 9, and the steps 1702 and 1708 are performed by the first device implementing the method of flowchart 900 of FIG. 9.

In step 1702 the device performs physical address identification related operations for the selected blockchain accounts. Step 1702 includes step 1704 or step 1706 depending on the particular embodiment. In a first exemplary embodiment, the device performs step 1704; in a second exemplary embodiment, the device performs step 1706.

In step 1704 the device performs operations to exchange address identification information with other nodes corresponding to the set of selected block chain account, e.g., using RSA or Diffe-Hellman key exchange. FIG. 18 is a drawing of exemplary step 1704', which is one exemplary a detailed method of implementing step 1704 of FIG. 17.

Step 1704' includes step 1800 in which the device securely exchanges physical identifiers, e.g., using a RSA (Rivest-Shamir-Adleman) based approach or using a Diffe-Hellman based approach. Step 1800 includes steps 1802, 1804, 1806, 1808, 1812, 1814, 1816, 1818, 18020, 1822, 1824, 1826, 1828 and 1830.

In step 1802 the device determines an ordering of selected accounts according to predetermined rules. Operation proceeds from step 1802 to step 1804. In step 1804 the device determines if it is the device's turn, e.g., in accordance with determined ordering or the selected accounts, to broadcast its public key and collect physical IDs from the other selected nodes. If the device determines that it is its turn to broadcast its public key and collect physical IDs from the other selected nodes, then operation proceeds from step 1804 to step 1806; otherwise, operation proceeds from step 1804 to step 1822.

In step 1806 the device broadcasts its public key to all the other nodes in the blockchain. Operation proceeds from step 1806 to step 1808. In step 1808 the device monitors for responses from the other selected nodes, which correspond to the other selected accounts. Step 1808 includes step 1810 in which the device receives an encrypted message from another one of the selected nodes. Step 1810 may be, and sometimes is, repeated multiple times, e.g., N−1 times, where N is the number of selected nodes. In response to an iteration of step 1810, operation proceeds from step 1810 to step 1812. In step 1812, the device decrypts the received encrypted message using a private key corresponding to the broadcast public key of step 1806, to recover a physical identifier for the another one of the selected nodes. Operation proceeds from step 1812 to step 1814 in which the device stores the recovered physical identifier. Operation proceed from step 1814 to step 1816.

In step 1816 the device determines if physical IDs have been recovered from each the other selected nodes. If the determination of step 1816 is that physical IDs have been recovered from each of the other selected nodes, then operation proceeds from step 1816 to step 1820, where the device terminates the monitoring of step 1808. Operation proceeds from step 1820, via connecting node A 1821 to step 1828. However, if the determination of step 1816 is that physical IDs have not yet been recovered from each of the other selected nodes, then operation proceeds from step 1816 to step 1818, where the device is operated to continue the monitoring of step 1808.

Returning to step 1822, in step 1822 the device receives a public key broadcast from one of the other selected nodes. Operation proceeds from step 1822 to step 1824, in which the device generates, using the received public key, and encrypted message including the device's physical identifier. Operation proceeds from step 1824 to step 1826 in which the device sends the encrypted message to the device from which the received public key was broadcast. Operation proceeds from step 1826, via connecting node A 1821, to step 1828.

In step 1828 the device determines if the ID exchanges are complete. If the determination is that the ID exchanges are not complete, then operation proceeds from step 1828, to step 1804. However, it the determination is that the ID exchanges are complete, then operation proceeds from step 1828, to step 1830, in which the device inputs the physical IDs to the topology generation component.

In some embodiments, the physical IDs in the communicated message are encrypted; however, the entire communicated message is not encrypted and decrypted, e.g., a communicated physical identifier undergoes encryption and decryption and is communicated as an encrypted payload portion in the communicated message.

In step 1706, the device performs physical address identification related operations for the selected blockchain accounts, e.g., on the P2P networking layer. FIG. 19 is a drawing of exemplary step 1706', which is one example a detailed method of implementing step 1706 of FIG. 17. Step 1706' includes steps 1902, 1904, 1908 and 1915. In step 1902 the device agrees with the other selected accounts on an identical (pre-assigned) index for a peer-to-peer protocol, where the (pre-assigned) identical index is a value which is not in use as a node ID. Operation proceeds from step 1902 to step 1904. In step 1904, the device replaces, in previously generated stored lists, the node IDs (e.g., blockchain account IDs) for the selected nodes, e.g., selected accounts, with the identical pre-assigned ID. Each of the nodes, e.g., each of the blockchain accounts, performs this operation, and the device implementing step 1706' is one of the nodes which performs this replacement operation. In some embodiments, step 1904 includes step 1906 in which the device updates one or more stored Kademlia lists (k-buckets) of (physical ID, e.g., IP-address, port, node ID) by temporarily replacing the node IDs of selected nodes with the identical (pre-assigned) index. Each node in the blockchain performs step 1906, and the device implementing step 1706' is one of the nodes which performs this replacement operation. Operation proceeds from step 1904 to step 1908.

In step 1908 the device employs peer discovery to find the physical IDs, e.g., IP addresses, of the other selected nodes. In some embodiments, step 1908 includes step 1910 in which the device finds other peers, e.g., IP addresses of other peers in the selected set of nodes, in the P2P network by searching the pre-assigned index. In some embodiments, step 1910 includes step 1912 in which the device follows a Kademlia iterative node searching (locating) algorithm to find the pre-assigned IDs in the network, e.g. other peers, (e.g., the IP addresses of the other peers) in the set of selected nodes, resulting in finding the physical addresses of other peers, e.g., the IP addresses of the other peers, in the set of selected nodes. In some embodiments, step 1812 includes step 1913 in which the device sends one or more find_node requests searching for the (pre-assigned) index. Operation proceeds from step 1912 to step 1913. In step 1913 the device receives one or more messages, each message communicating a physical ID, e.g., an IP address, corresponding to the searched index. Operation proceeds from step 1908 to step 1915.

In step 1915 the device inputs the recovered physical IDs, e.g., IP addresses, to the topology generation component.

Operation proceeds from step 1702 to step 1708. In step 1708 the device performs topology generation operations to optimize a network topology formed by the selected nodes. Step 1708 includes step 1710 in which the device uses a topology generation method to optimize topology for the selected nodes, said physical IDs of the selected set of nodes being known to the members of the set of selected nodes. The topology can be, e.g., a tree, a ring, a star mesh, or a combination thereof. Step 1710 includes step 1712, 1716 and 1718. In step 1712 the device participates in generating a topology table, e.g., as an output of a networking component. Step 1712 includes step 1714 in which the device participates in generating a topology table including "KEY PAIRs", e.g., one line of the table being a pair of (node index, one-hop neighbors), where the neighbors are represented by physical IDs. Operation proceeds from step 1712 to step 1716. In step 1716 the device connects nodes following the topology table in a peer-to-peer fashion, e.g., if using the Internet, the physical addresses are IP addresses. Operation proceeds from step 1716 to step 1718 in which the device connects the nodes via a typical routing protocol, e.g. a typical IP-based routing protocol.

NUMBERED LIST OF EXEMPLARY METHOD EMBODIMENTS

Method Embodiment 1

A method of operating a first device with computing capability in a computing network, the method comprising: receiving (910) a blockchain based computing task request from a second device (requesting device); executing (912) a resource allocation component (smart contract portion) of a blockchain to select multiple devices in the computing network to service the requested computing task, said resource allocation component outputting selected node information (e.g., node IDs, blockchain Account ID or other information identifying the selected compute nodes) to a networking component (networking smart contract), said first device being one of the selected devices; and operating (941) the networking component to generate a set of network topology information for the selected devices and to control the first device to use information in the generated set of network topology information to establish a communications connection with a third device (another compute node), said third device being one of the plurality of devices selected to service the requested computing task; operating (943) the first device to work on a portion of the requested computing task and to generate a first computing result portion; and operating (945) the first device to provide computing results to the second device (requesting device).

Method Embodiment 2

The method of Method Embodiment 1, wherein said first device provides said computing results to the second device in a broadcast signal.

Method Embodiment 3

The method of Method Embodiment 2, wherein said broadcast signal is a blockchain synchronization signal.

Method Embodiment 4

The method of claim 1, further comprising: communicating (918) a first public key to one or more devices in said selected set of devices, said one or more devices to which the first public key is communicated including the third device, wherein said first public key is part of a first public/private key pair of the first device, said first public/private key pair including said first public key and a first private key.

Method Embodiment 5

The method of Method Embodiment 4, further comprising: generating (916) said first public key and first private key of the first public/private key pair of the first device.

Method Embodiment 6

The method of Method Embodiment 4, further comprising: receiving (922) a third encrypted physical ID from the third device, said third encrypted physical ID being an encrypted version of a third physical ID that was generated using the first public key of the first device to encrypt the third physical ID, the third physical ID being a physical ID of the third device; and decrypting (924), using the first private key in possession of the first device, the third encrypted physical ID to recover the third physical ID.

Method Embodiment 7

The method of Method Embodiment 6 further comprising: receiving (928) a third public key from the third device, said third public key being a third public key corresponding to a third private key of a third public/private key pair of the third device, said third device being in possession and having access to the third private key.

Method Embodiment 8

The method of Method Embodiment 7, further comprising: communicating (942) with the third device using the third physical ID as a destination address of a unicast communication.

Method Embodiment 9

The method of Method Embodiment 7 wherein receiving (926) the third public key includes receiving (928) a broadcast message sent by the third device communicating the third public key.

Method Embodiment 10

The method of Method Embodiment 7, further comprising: encrypting (930) a first physical ID of the first device using the third public key; transmitting (932) the encrypted first physical ID to the third device; and wherein communicating (918) the first public key to one or more devices in said selected set of devices includes broadcasting (920) the first public key using as a destination address a broadcast address corresponding to a group of devices to which the selected devices are members.

Method Embodiment 11

The method of Method Embodiment 6, wherein the third physical ID is one of an IP address of the third device, domain name corresponding to the third device, pre-assigned alias of the third device or MAC address of the third device.

Method Embodiment 12

The method of Method Embodiment 11, wherein devices which were not selected to service the requested computing task do not have access to the first private key required to decrypt the third encrypted physical ID and wherein the first device has access to the first private key required to decrypt the third encrypted physical ID.

Method Embodiment 13

The method of Method Embodiment 1, further comprising: determining (934) a first group identifier (e.g., index corresponding to the set of devices selected to perform the computing task) to be used to identify the selected devices, said selected devices being a group; using (936) the first group identifier to broadcast a discovery signal; and receiving (938) a peer to peer response from the third node in response to the broadcast discovery signal.

Method Embodiment 14

The method of Method Embodiment 13, wherein said response from the third device includes a physical identifier of the third device.

Method Embodiment 15

The method of Method Embodiment 1, further comprising: operating (947) the first device to receive a second computing result portion from the third device.

Method Embodiment 16

The method of Method Embodiment 15, further comprising, prior to receiving (910) a blockchain based computing task request from a second device: downloading (904) said blockchain; creating (906) a first computing device account including first computing device account information about the first computing device (e.g., processing capability, memory, max file storage size); and sending (908) a blockchain update to one or more other devices, said blockchain update including the first device account information.

Method Embodiment 17

The method of Method Embodiment 16, further comprising: performing (948) a result verification operation.

Method Embodiment 18

The method of Method Embodiment 17, wherein performing (948) a result verification operation includes operating (949) the first device to verify the received second computing result portion.

Method Embodiment 19

The method of Method Embodiment 18 further comprising: broadcasting (950) the results of the verification of the second computing result portion to other devices implementing the blockchain.

Method Embodiment 20

The method of Method Embodiment 17, further comprising: sending (946) at least the first computing result portion to a fourth device which performs a verification operation.

Method Embodiment 21

The method of Method Embodiment 20, further comprising: receiving (950) a computing verification result from the fourth device in a broadcast block chain update transmitted by the fourth device.

Method Embodiment 22

The method of Method Embodiment 17, further comprising: determining (952) if one or more of the computing verification results indicates a verification failure.

Method Embodiment 23

The method of Method Embodiment 22, further comprising: selecting (962) a new set of devices to perform at least a portion of the requested computing operation when said computing verification result indicates a verification failure.

Method Embodiment 24

The method of Method Embodiment 23, further comprising: accepting (960) compensation for computing when said verification indicates a valid computing result.

Method Embodiment 25

The method of Method Embodiment 16, wherein said blockchain includes one or more smart contracts.

Method Embodiment 26

The method of Method Embodiment 1, further comprising: determining (934) a first group identifier (e.g., index corresponding to the set of devices selected to perform the computing task) to be used to identify the selected devices, said selected devices being a group; replacing (935) a node ID of a selected device with said first group identifier in a stored mapping list; sending (937) a search request including said first group identifier; and receiving (939) a response signal from the third node in response to the search request signal.

Method Embodiment 27

The method of Method Embodiment 26, wherein said response from the third device includes a physical identifier of the third device.

Method Embodiment 28

The method of Method Embodiment 26, wherein said stored mapping list is a Kademlia k-bucket.

Method Embodiment 29

The method of Method Embodiment 26, wherein said search request is a Find node request signal.

NUMBERED LIST OF EXEMPLARY APPARATUS EMBODIMENTS

Apparatus Embodiment 1

A first device (1000), the first device (1000) comprising: a receiver (1016 or 1020) configured to receive a blockchain based computing task request from a second device (e.g., a requesting device); a memory (1010) for storing the blockchain; and a processor (1002) configured to: execute a resource allocation component (smart contract portion) of a blockchain to select multiple devices in the computing network to service the requested computing task, said resource allocation component outputting selected node information (e.g., node IDs, blockchain Account ID or other information identifying the selected compute nodes) to a networking component (networking smart contract), said first device being one of the selected devices; and operate a networking component to generate a set of network topology information for the selected devices and to control the first device to use information in the generated set of network topology information to establish a communications connection with a third device (another compute node), said third device being one of the plurality of devices selected to service the requested computing task; work on a portion of the requested computing task and to generate a first computing result portion; and control the first device to provide computing results to the second device (requesting device).

Apparatus Embodiment 2

The first device (1000) of Apparatus Embodiment 1, wherein said first device provides said computing results to the second device in a broadcast signal.

Apparatus Embodiment 3

The first device (1000) of Apparatus Embodiment 2, wherein said broadcast signal is a blockchain synchronization signal.

Apparatus Embodiment 4

The first device (1000) of Apparatus Embodiment 1, wherein said processor (1002) is further configured to: control the first device (1000) to communicate (918) a first public key to one or more devices in said selected set of devices, said one or more devices to which the first public key is communicated including the third device, wherein said first public key is part of a first public/private key pair of the first device, said first public/private key pair including said first public key and a first private key.

Apparatus Embodiment 5

The first device (1000) of Apparatus Embodiment 4, wherein said processor (1002) is further configured to: generate (916) said first public key and first private key of the first public/private key pair of the first device.

Apparatus Embodiment 6

The first device (1000) of Apparatus Embodiment 4, wherein said processor (1002) is further configured to: control the first device (1000) to receive (922) a third encrypted physical ID from the third device, said third encrypted physical ID being an encrypted version of a third physical ID that was generated using the first public key of the first device to encrypt the third physical ID, the third physical ID being a physical ID of the third device; and decrypt (924), using the first private key in possession of the first device, the third encrypted physical ID to recover the third physical ID.

Apparatus Embodiment 7

The first device (1000) of Apparatus Embodiment 6, wherein said processor (1002) is further configured to: control the first device (1000) to receive (928) a third public key from the third device, said third public key being a third public key corresponding to a third private key of a third public/private key pair of the third device, said third device being in possession and having access to the third private key.

Apparatus Embodiment 8

The first device (1000) of Apparatus Embodiment 7, wherein said processor (1002) is further configured to: control the first device (1000) to communicate (942) with the third device using the third physical ID as a destination address of a unicast communication.

Apparatus Embodiment 9

The first device (1000) of Apparatus Embodiment 7, wherein receiving (926) the third public key includes receiving (928) a broadcast message sent by the third device communicating the third public key.

Apparatus Embodiment 10

The first device (1000) of Apparatus Embodiment 7, wherein said processor (1002) is further configured to: encrypt (930) a first physical ID of the first device using the third public key; and control the first device (1000) to transmit (932) the encrypted first physical ID to the third device; and wherein said processor (1002) is configured to control the first device (1000) to broadcast (920) the first public key using as a destination address a broadcast address corresponding to a group of devices to which the selected devices are members, as part of being configured to communicate (918) the first public key to one or more devices in said selected set of devices.

Apparatus Embodiment 11

The first device (1000) of Apparatus Embodiment 6, wherein the third physical ID is one of an IP address of the third device, domain name corresponding to the third device, pre-assigned alias of the third device or MAC address of the third device.

Apparatus Embodiment 12

The first device (1000) of Apparatus Embodiment 11, wherein devices which were not selected to service the requested computing task do not have access to the first private key required to decrypt the third encrypted physical ID and wherein the first device has access to the first private key required to decrypt the third encrypted physical ID.

Apparatus Embodiment 13

The first device (1000) of Apparatus Embodiment 1, wherein said processor (1002) is further configured to: determine (934) a first group identifier (e.g., index corresponding to the set of devices selected to perform the computing task) to be used to identify the selected devices, said selected devices being a group; use (936) the first group identifier to broadcast a discovery signal; and control the first device (1000) to receive (938) a peer to peer response from the third node in response to the broadcast discovery signal.

Apparatus Embodiment 14

The first device (1000) of Apparatus Embodiment 13, wherein said response from the third device includes a physical identifier of the third device.

Apparatus Embodiment 15

The first device (1000) of Apparatus Embodiment 1, wherein said processor (1002) is further configured to: operate (947) the first device (1002) to receive a second computing result portion from the third device.

Apparatus Embodiment 16

The first device (1000) of Apparatus Embodiment 15, wherein said processor (1002) is further configured to control the first device (1000) to: download (904) said blockchain; create (906) a first computing device account including first computing device account information about the first computing device (e.g., processing capability, memory, max file storage size); and send (908) a blockchain update to one or more other devices, said blockchain update including the first device account information, said downloading, creating, and sending being performed prior to said receiving (910) a blockchain based computing task request from a second device.

Apparatus Embodiment 17

The first device (1000) of Apparatus Embodiment 16, wherein said processor (1002) is further configured to: perform (948) a result verification operation.

Apparatus Embodiment 18

The first device (1000) of Apparatus Embodiment 17, wherein said processor (1002) is configured to operate (949) the first device to verify the received second computing result portion, as part of being configured to perform (948) a result verification operation.

Apparatus Embodiment 19

The first device (1000) of Apparatus Embodiment 18, wherein said processor (1002) is further configured to control the first device (1000) to: broadcast (950) the results of the verification of the second computing result portion to other devices implementing the blockchain.

Apparatus Embodiment 20

The first device (1000) of Apparatus Embodiment 17, wherein said processor (1002) is further configured to: control the first device (1000) to send (946) at least the first computing result portion to a fourth device which performs a verification operation.

Apparatus Embodiment 21

The first device (1000) of Apparatus Embodiment 20, wherein said processor (1002) is further configured to: control the first device (1000) to receive (950) a computing verification result from the fourth device in a broadcast block chain update transmitted by the fourth device.

Apparatus Embodiment 22

The first device (1000) of Apparatus Embodiment 17, wherein said processor (1002) is further configured to: determine (952) if one or more of the computing verification results indicates a verification failure.

Apparatus Embodiment 23

The first device (1000) of Apparatus Embodiment 22, wherein said processor (1002) is further configured to: select (962) a new set of devices to perform at least a portion of the requested computing operation when said computing verification result indicates a verification failure.

Apparatus Embodiment 24

The first device (1000) of Apparatus Embodiment 23, wherein said processor (1002) is further configured to: accept (960) compensation for computing when said verification indicates a valid computing result.

Apparatus Embodiment 25

The first device (1000) of Apparatus Embodiment 16, wherein said blockchain includes one or more smart contracts.

Apparatus Embodiment 26

The first device (1000) of Apparatus Embodiment 1, wherein said processor (1002) is further configured to: determine (934) a first group identifier (e.g., index corresponding to the set of devices selected to perform the computing task) to be used to identify the selected devices, said selected devices being a group; replace (935) a node ID of a selected device with said first group identifier in a stored mapping list; send (937) a search request including said first group identifier; and receive (939) a response signal from the third node in response to the search request signal.

Apparatus Embodiment 27

The first device (1000) of Apparatus Embodiment 26, wherein said response from the third device includes a physical identifier of the third device.

Apparatus Embodiment 28

The first device (1000) of Apparatus Embodiment 26, wherein said stored mapping list is a Kademlia k-bucket.

Apparatus Embodiment 29

The first device (1000) of Apparatus Embodiment 26, wherein said search request is a Find node request signal.

LIST OF EXEMPLARY COMPUTER READABLE MEDIUM EMBODIMENTS

Computer Readable Medium Embodiment 1

A non-transitory computer readable medium (1010) including computer executable instructions which when executed by a processor (1002) control a first device (1000) to perform the steps of: receiving (910) a blockchain based computing task request from a second device (requesting device); executing (912) a resource allocation component (smart contract portion) of a blockchain to select multiple devices in the computing network to service the requested computing task, said resource allocation component outputting selected node information (e.g., node IDs, blockchain Account ID or other information identifying the selected compute nodes) to a networking component (networking smart contract), said first device being one of the selected devices; and operating (941) the networking component to generate a set of network topology information for the selected devices and to control the first device to use information in the generated set of network topology information to establish a communications connection with a third device (another compute node), said third device being one of the plurality of devices selected to service the requested computing task; operating (943) the first device to work on a portion of the requested computing task and to generate a first computing result portion; and operating (945) the first device to provide computing results to the second device (requesting device).

The techniques of various embodiments may be implemented using software, hardware and/or a combination of software and hardware. Various embodiments are directed to apparatus, e.g., personal computers, desk top computers, laptops, servers, cell phones, computer notepads, user devices, base stations, servers, customer premises equipment devices, network nodes, gateways, cluster controllers, cloud nodes, cloud service servers and/or network equipment devices. Various embodiments are also directed to methods, e.g., method of controlling and/or operating apparatus, e.g. various types of computers, user devices, base stations, gateways, servers, cable networks, cloud networks, nodes, servers, cloud service servers, customer premises equipment devices, controllers, and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a controller or other device described in the present application. In some embodiments components are implemented as hardware devices in such embodiments the components are hardware components. In other embodiments components maybe implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first device with computing capability in a computing network, the method comprising:
   receiving a blockchain based computing task request from a second device;
   executing a resource allocation component of a blockchain to select multiple devices in the computing network to service the requested computing task, said resource allocation component outputting selected node information to a networking component, said first device being one of the selected devices; and
   operating the networking component to generate a set of network topology information for the selected devices and to control the first device to use information in the generated set of network topology information to establish a communications connection with a third device, said third device being one of the multiple devices selected to service the requested computing task;
   operating the first device to work on a portion of the requested computing task and to generate a first computing result portion; and
   operating the first device to provide computing results to the second device.

2. The method of claim 1, further comprising:
   generating a first public key and a first private key of a first public/private key pair of the first device; and
   communicating the first public key to one or more devices of said selected multiple devices, said one or more devices to which the first public key is communicated including the third device, wherein said first public key is part of said first public/private key pair of the first device, said first public/private key pair including said first public key and said first private key.

3. The method of claim 2, further comprising:
   receiving a third encrypted physical ID from the third device, said third encrypted physical ID being an encrypted version of a third physical ID that was generated using the first public key of the first device to encrypt the third physical ID, the third physical ID being a physical ID of the third device; and
   decrypting, using the first private key in possession of the first device, the third encrypted physical ID to recover the third physical ID.

4. The method of claim 1, further comprising:
   operating the first device to receive a second computing result portion from the third device.

5. The method of claim 4, further comprising, prior to receiving a blockchain based computing task request from a second device:
   downloading said blockchain;
   creating a first device account including first device account information about the first device; and
   sending a blockchain update to one or more other devices, said blockchain update including the first device account information.

6. The method of claim 5, further comprising:
   performing a result verification operation.

7. The method of claim 6, further comprising:
   determining if one or more of the computing verification results indicates a verification failure.

8. The method of claim 7, further comprising:
   selecting a new set of devices to perform at least a portion of the requested computing task when said computing verification result indicates a verification failure.

9. The method of claim 5, wherein said blockchain includes one or more smart contracts.

10. The method of claim 1, wherein operating the networking component to generate a set of network topology information for the selected devices includes generating a topology table including key pairs, each line of the topology table being a pair of:
  i) node index, and ii) one-hop neighbors, where the neighbors are represented by physical IDs.

11. A first device, the first device comprising:
  a receiver configured to receive a blockchain based computing task request from a second device;
  a memory for storing the blockchain; and
  a processor configured to:
    execute a resource allocation component of a blockchain to select multiple devices in a computing network to service the requested computing task, said resource allocation component outputting selected node information to a networking component, said first device being one of the selected devices; and
    operate the networking component to generate a set of network topology information for the selected devices and to control the first device to use information in the generated set of network topology information to establish a communications connection with a third device, said third device being one of the multiple devices selected to service the requested computing task;
    work on a portion of the requested computing task and generate a first computing result portion; and
    control the first device to provide computing results to the second device.

12. The first device of claim 11, wherein said processor is further configured to:
  control the first device to generate a first public key and a first private key of a first public/private key pair of the first device; and
  control the first device to communicate the first public key to one or more devices of said selected multiple devices, said one or more devices to which the first public key is communicated including the third device, wherein said first public key is part of the first public/private key pair of the first device, said first public/private key pair including said first public key and said first private key.

13. The first device of claim 12, wherein said processor is further configured to:
  control the first device to receive a third encrypted physical ID from the third device, said third encrypted physical ID being an encrypted version of a third physical ID that was generated using the first public key of the first device to encrypt the third physical ID, the third physical ID being a physical ID of the third device; and
  decrypt, using the first private key in possession of the first device, the third encrypted physical ID to recover the third physical ID.

14. The first device of claim 11, wherein said processor is further configured to:
  operate the first device to receive a second computing result portion from the third device.

15. The first device of claim 14, wherein said processor is further configured to control the first device to:
  download said blockchain;
  create a first device account including first device account information about the first device; and
  send a blockchain update to one or more other devices, said blockchain update including the first device account information,
  said downloading, creating, and sending being performed prior to said receiving said blockchain based computing task request from said second device.

16. The first device of claim 13, wherein said processor is further configured to:
  perform a result verification operation.

17. The first device of claim 16, wherein said processor is further configured to:
  determine if one or more of the computing verification results indicates a verification failure.

18. The first device of claim 17, wherein said processor is further configured to:
  select a new set of devices to perform at least a portion of the requested computing task when said computing verification result indicates a verification failure.

19. The first device of claim 15, wherein said blockchain includes one or more smart contracts.

20. A non-transitory computer readable medium including computer executable instructions which when executed by a processor control a first device to perform the steps of:
  receiving a blockchain based computing task request from a second device;
  executing a resource allocation component of a blockchain to select multiple devices in the computing network to service the requested computing task, said resource allocation component outputting selected node information to a networking component, said first device being one of the selected devices; and
  operating the networking component to generate a set of network topology information for the selected devices and to control the first device to use information in the generated set of network topology information to establish a communications connection with a third device, said third device being one of the multiple devices selected to service the requested computing task;
  operating the first device to work on a portion of the requested computing task and to generate a first computing result portion; and
  operating the first device to provide computing results to the second device.

* * * * *